United States Patent
Hu et al.

(10) Patent No.: US 11,425,405 B2
(45) Date of Patent: Aug. 23, 2022

(54) CROSS-COMPONENT ADAPTIVE LOOP FILTER IN VIDEO CODING

(71) Applicant: QUALCOMM Incorporated, San Diego, CA (US)

(72) Inventors: Nan Hu, San Diego, CA (US); Vadim Seregin, San Diego, CA (US); Cheng-Teh Hsieh, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/096,740

(22) Filed: Nov. 12, 2020

(65) Prior Publication Data

US 2021/0152841 A1 May 20, 2021

Related U.S. Application Data

(60) Provisional application No. 62/985,684, filed on Mar. 5, 2020, provisional application No. 62/936,046, filed on Nov. 15, 2019.

(51) Int. Cl.
*H04N 19/105* (2014.01)
*H04N 19/132* (2014.01)
(Continued)

(52) U.S. Cl.
CPC .......... *H04N 19/44* (2014.11); *H04N 19/105* (2014.11); *H04N 19/117* (2014.11);
(Continued)

(58) Field of Classification Search
CPC .................................................. H04N 19/44
See application file for complete search history.

(56) References Cited

U.S. PATENT DOCUMENTS

| 11,115,671 B2 * | 9/2021 | Kuo ..................... H04N 19/105 |
| 11,265,558 B2 * | 3/2022 | Hu ........................ H04N 19/117 |

(Continued)

FOREIGN PATENT DOCUMENTS

| WO | WO-2021013178 A1 * | 1/2021 | ........... H04N 19/117 |
| WO | WO-2021083258 A1 * | 5/2021 | ........... H04N 19/186 |

OTHER PUBLICATIONS

International Search Report and Written Opinion—PCT/US2020/060597—ISA/EPO—dated Mar. 15, 2021.

(Continued)

*Primary Examiner* — Irfan Habib
(74) *Attorney, Agent, or Firm* — Shumaker & Sieffert, P.A.

(57) ABSTRACT

An example device for decoding video data includes one or more processors implemented in circuitry and configured to: decode a coding tree unit (CTU) of video data, the CTU including a luminance (luma) block and a chrominance (chroma) block, to produce a decoded luma block and a decoded chroma block; determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disable cross-component adaptive loop filtering (CC-ALF) for the chroma sample.

30 Claims, 14 Drawing Sheets

(51) Int. Cl.
H04N 19/176 (2014.01)
H04N 19/82 (2014.01)
H04N 19/44 (2014.01)
H04N 19/186 (2014.01)
H04N 19/117 (2014.01)

(52) U.S. Cl.
CPC ......... *H04N 19/132* (2014.11); *H04N 19/176* (2014.11); *H04N 19/186* (2014.11); *H04N 19/82* (2014.11)

(56) References Cited

U.S. PATENT DOCUMENTS

| | | | | |
|---|---|---|---|---|
| 2016/0241880 | A1* | 8/2016 | Chao | H04N 19/86 |
| 2016/0241881 | A1* | 8/2016 | Chao | H04N 19/117 |
| 2021/0067793 | A1* | 3/2021 | Hu | H04N 19/44 |
| 2021/0076032 | A1* | 3/2021 | Hu | H04N 19/159 |
| 2021/0092368 | A1* | 3/2021 | Du | H04N 19/117 |
| 2021/0099700 | A1* | 4/2021 | Li | H04N 19/186 |
| 2021/0152841 | A1* | 5/2021 | Hu | H04N 19/167 |
| 2021/0160513 | A1* | 5/2021 | Hu | H04N 19/186 |
| 2021/0266604 | A1* | 8/2021 | Du | H04N 19/186 |
| 2021/0274170 | A1* | 9/2021 | Du | H04N 19/157 |
| 2021/0274186 | A1* | 9/2021 | Andersson | H04N 19/117 |
| 2021/0306652 | A1* | 9/2021 | Chen | H04N 19/174 |
| 2021/0321138 | A1* | 10/2021 | Samuelsson | H04N 19/174 |
| 2021/0360238 | A1* | 11/2021 | Chen | H04N 19/167 |

OTHER PUBLICATIONS

Kuo C-W, (Panasonic), et al., "CE5-related: Unification of CCALF and ALF," 16, JVET Meeting, Oct. 1, 2019-Oct. 11, 2019, Geneva, (The Joint Video Exploration Team of ISO/IEC JTC1/SC29/WG11 and ITU-T SG.16), No. JVET-P0178, Sep. 24, 2019 (Sep. 24, 2019), XP030216529, 5 pages, Retrieved from the Internet: URL: http://phenix.int-evry.fr/jvet/doc_end_user/documents/16_Geneva/wg11/JVET-P0178-v1.zip JVET-P0178/JVET-P0178-v1.docx [retrieved on Sep. 24, 2019].

Meng (PKU) X W, et al., "CCALF Virtual Boundary Issue for 4:4:4 and 4:2:2 Format," 130, MPEG Meeting; Apr. 20, 2020-Apr. 24, 2020; Alpbach, (Motion Picture Expert Group or ISO/IEC JTC1/SC29/WG11), No. m53306, JVET-R0322, Apr. 19, 2020 (Apr. 19, 2020), XP030286496, Retrieved from the Internet: URL: http://phenix.int-evry.fr/mpeg/doc_end_user/documents/130_Alpbach/wg11/m53306-JVET-R0322-v4-JVET-R0322-v4.zip JVET-R0322-v4/JVET-R0322-v4.docx [retrieved on Apr. 19, 2020].

Misra Kiran, et al., "On Cross Component Adaptive Loop Filter for Video Compression," 2019 Picture Coding Symposium (PCS), IEEE, Nov. 12, 2019 (Nov. 12, 2019), pp. 1-5, XP033688175, DOI:10.1109/PCS48520.2019.8954547 [retrieved on Jan. 8, 2020].

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q2001-vD, 514 Pages.

He Y., et al., "AHG9: Miscellaneous HLS Topics", JVET-R0266, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-5.

He Y., et al., "AHG9: On Decoding Capability Information", JVET-R0260, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-2.

He Y., et al., "AHG9: On PPS Syntax", JVET-R0262-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-4.

He Y., et al., "AHG9: On VPS Syntax", JVET-R0261, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-6.

Hu N., et al., "AHG16: Line Buffer Problem of CC-ALF for 4:2:2 and 4:4:4 Sequences", JVET-R0233-v3, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-8.

Hu N., et al., "CE5-related: Reduced Filter Shape for Cross Component Adaptive Loop Filter", JVET-P0558, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Misra K., et al., "CE5-related: On the Design of CC-ALF", JVET-P1008-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.

Misra (Sharplabs) K., et al., "Cross-Component Adaptive Loop Filter for Chroma", 15th JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0636_r1, Jul. 7, 2019 (Jul. 7, 2019), XP030220123, pp. 1-9, Retrieved from the Internet: URL:http://phenix.int-evry.fr/jvet/doc_end_user/documents/15_Gothenburg/wg11/JVEf-O0636-v2.zip, JVET-O0636_r1.docx [retrieved on Jul. 7, 2019], Sections 1, 6.

Seregin V., et al., "AHG8: On PTL, HRD, and DPB Structures Signalling in VPS and SPS", JVET-R0275-v2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-10.

U.S. Appl. No. 16/929,868, filed Jul. 15, 2020, by Nan Hu et al.

* cited by examiner

CROSS-COMPONENT ADAPTIVE LOOP FILTER IN VIDEO CODING

CROSS-COMPONENT ADAPTIVE LOOP FILTER IN VIDEO CODING

This application claims the benefit of U.S. Provisional Application 62/936,046, filed Nov. 15, 2019 and U.S. Provisional Application 62/985,684, filed Mar. 5, 2020, the entire content of each of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to cross-component adaptive loop filter (CC-ALF) filtering techniques for video coding. In CC-ALF, a video coder may refine chroma samples using co-located luma samples. For instance, the video coder may filter the chroma samples using adaptive loop filtering, and the video coder may refine the resulting filtered chroma samples using the luma samples. The refinement of the chroma samples may occur before adaptive loop filtering of the chroma samples (i.e., chroma samples may be refined and then filtered or filtered and then refined).

Due to different sample chroma subsampling formats (e.g., 4:4:4, 4:2:2, or 4:2:0 formats) and limitations of buffer sizes, it may be possible that some samples needed for CC-ALF are not available in a line buffer (which may store a coding tree unit (CTU) row). For example, chroma samples and co-located luma samples may be on different sides of an ALF virtual boundary, and also in different line buffers. This disclosure describes examples of practical applications of performing CC-ALF to address issues where samples needed for CC-ALF are not available. The example techniques may be utilized in existing video coding standards like the high efficiency video coding (HEVC) standard or the versatile video coding (VVC) standard. The techniques of this disclosure are not limited to a particular video coding standard and may be used as part of video coding (encoding and/or decoding) according to a variety of video coding standards.

In one example, a method of decoding video data includes decoding a coding tree unit (CTU) of video data, the CTU including a luminance (luma) block and a chrominance (chroma) block, to produce a decoded luma block and a decoded chroma block; determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disabling cross-component adaptive loop filtering (CC-ALF) for the chroma sample.

In another example, a device for decoding video data includes a memory configured to store video data; and one or more processors implemented in circuitry and configured to: decode a coding tree unit (CTU) of the video data, the CTU including a luminance (luma) block and a chrominance (chroma) block, to produce a decoded luma block and a decoded chroma block; determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disable cross-component adaptive loop filtering (CC-ALF) for the chroma sample.

In another example, a computer-readable storage medium has stored thereon instructions that, when executed, cause a processor to decode a coding tree unit (CTU) of video data, the CTU including a luminance (luma) block and a chrominance (chroma) block, to produce a decoded luma block and a decoded chroma block; determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disable cross-component adaptive loop filtering (CC-ALF) for the chroma sample.

In another example, a device for decoding video data includes means for decoding a coding tree unit (CTU) of video data, the CTU including a luminance (luma) block and a chrominance (chroma) block, to produce a decoded luma block and a decoded chroma block; means for determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and means for disabling cross-component adaptive loop filtering (CC-ALF) for the chroma sample in response to determining that the chroma sample is on the first side and the luma sample is on the second side.

The details of one or more examples are set forth in the accompanying drawings and the description below. Other features, objects, and advantages will be apparent from the description, drawings, and claims.

BRIEF DESCRIPTION OF DRAWINGS

FIG. 6 is a conceptual diagram illustrating an example of a 4×3 filter used for CC-ALF.

FIG. 7 is a conceptual diagram illustrating an example of a 5×5 filter used for CC-ALF.

DETAILED DESCRIPTION

Figure 1:
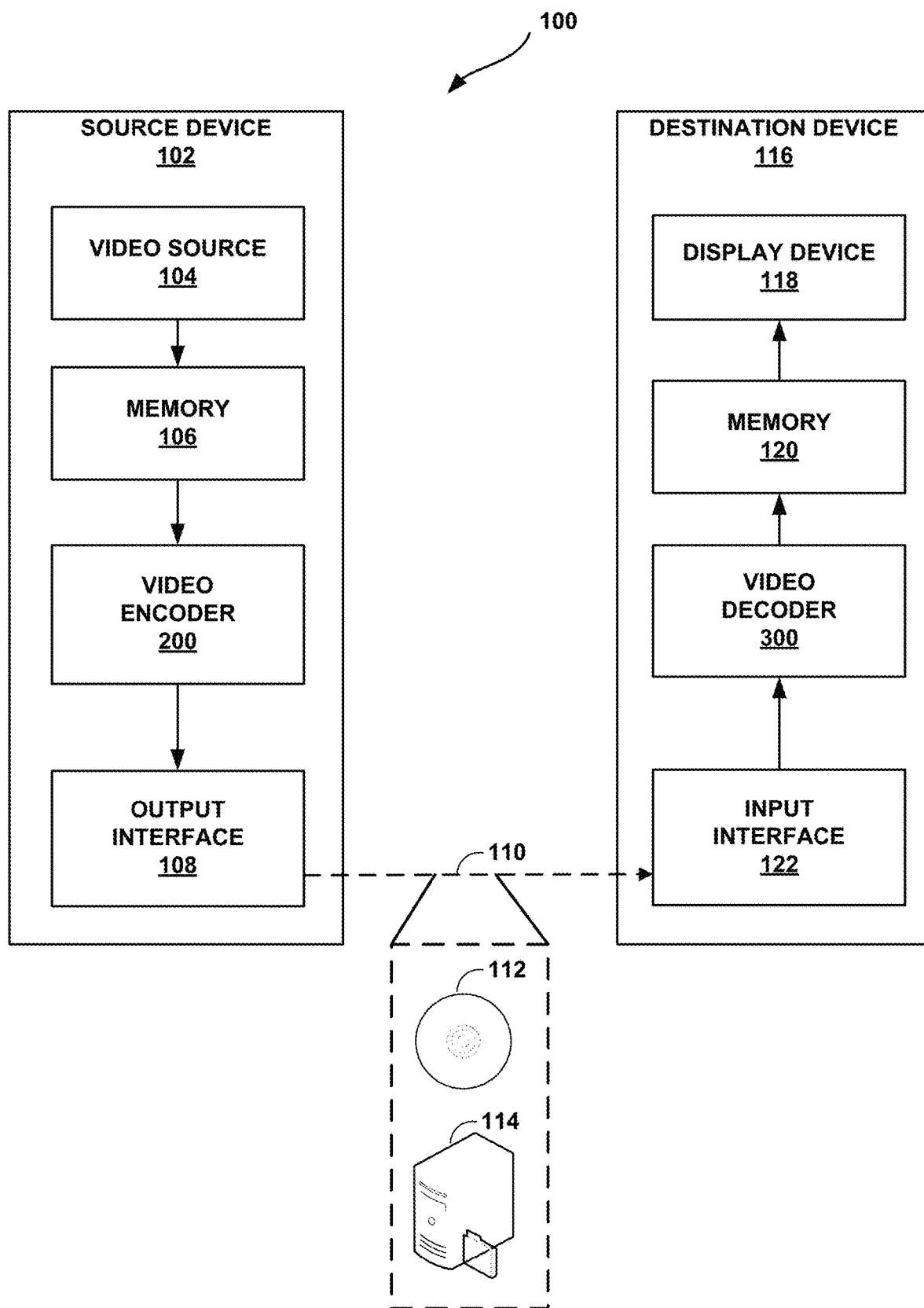
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for cross-component adaptive loop filter (CC-ALF) in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for CC-ALF in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). Another draft of the VVC standard is described in Bross et al., "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vD (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance (luma) and/or chrominance (chroma) data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In some examples, video encoder 200 and video decoder 300 may include a filter unit configured to perform filtering such as deblock filtering, sample adaptive offset (SAO) filtering, and/or adaptive loop filtering. Video encoder 200 and video decoder 300 may perform adaptive loop filtering on the luma samples and the chroma samples of a reconstructed block. For instance, video encoder 200, as part of its decoding loop, may reconstruct a block (e.g., in a same way that video decoder 300 will reconstruct the block), and video encoder 200 may apply adaptive loop filtering to the luma and chroma samples of the reconstructed block, then store the filtered, reconstructed block in a decoded picture buffer (e.g., to be used in a reference picture for subsequent inter-prediction). Video decoder 300 may reconstruct the block (e.g., by adding residual information to a prediction block) and apply adaptive loop filtering to the luma and chroma samples, then store the filtered, reconstructed samples, and also output the filtered, reconstructed samples.

In accordance with the techniques of this disclosure, video encoder 200 and video decoder 300 may perform cross-component adaptive loop filtering (CC-ALF). In cross-component adaptive loop filtering, video encoder 200 and video decoder 300 may use luma samples to refine adaptive loop filtering of chroma samples (e.g., refine chroma samples first and then perform adaptive loop filtering or perform adaptive loop filtering and then refine chroma samples).

In general, video encoder 200 and video decoder 300 code blocks of a picture in raster scan order, e.g., left-to-right and top-to-bottom. After completing coding of a CTU row, video encoder 200 and video decoder 300 may clear samples of the CTU row from memory before proceeding to code blocks of a subsequent CTU row. This disclosure recognizes that in some instances, however, samples used for CC-ALF may be present in the cleared portion above a current CTU line, meaning that the samples needed for CC-ALF may have already been cleared from memory.

Additionally or alternatively, due to a chroma sampling format (e.g., 4:4:4) or subsampling format (e.g., 4:2:2 or 4:2:0), there is a possibility that luma samples used for the cross-component adaptive loop filtering are unavailable. For example, a line or column buffer that stores sample values used for cross-component adaptive loop filtering may be limited in size and therefore may not store some luma samples that would be used for cross-component adaptive loop filtering of a chroma sample.

This disclosure describes example techniques with practical applications to address such issues with cross-component adaptive loop filtering. The example techniques may result in better quality filtering and/or better performance of video encoder 200 and video decoder 300. For example, a video coder (e.g., video encoder 200 or video decoder 300) may be configured to determine that one or more luma samples used for cross-component adaptive loop filtering a chroma sample are unavailable, and at least one of: (1) replace the one or more unavailable luma samples with one or more available luma samples and perform cross-component adaptive loop filtering on the chroma sample with the one or more available luma samples, (2) perform cross-component adaptive loop filtering on the chroma sample without replacing the one or more unavailable luma samples, or (3) bypass performing cross-component adaptive loop filtering on the chroma sample.

In one specific example, video encoder 200 and video decoder 300 may be configured to decode a CTU of video data, the CTU including a luma block and a chroma block (e.g., at least one chroma block, such as including two chroma blocks), to produce a decoded luma block and a decoded chroma block. Video encoder 200 and video decoder 300 may determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side. The ALF virtual boundary, also referred to herein as an ALF unit boundary, represents a boundary around a set of samples that may be used to perform ALF (e.g., CC-ALF) on other samples within the ALF virtual boundary. For example, the samples above an ALF virtual boundary may be cleared in memory of an encoder and decoder when processing the next CTU line. However, this may mean that certain luma samples that would otherwise be used for CC-ALF are not available, e.g., when chroma samples are on one side of the ALF virtual boundary and luma samples are on the other side of the ALF virtual boundary. Thus, in response to determining that the chroma sample is on the first side and the luma sample is on the second side, video encoder 200 and video decoder 300 may disable CC-ALF for the chroma sample.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
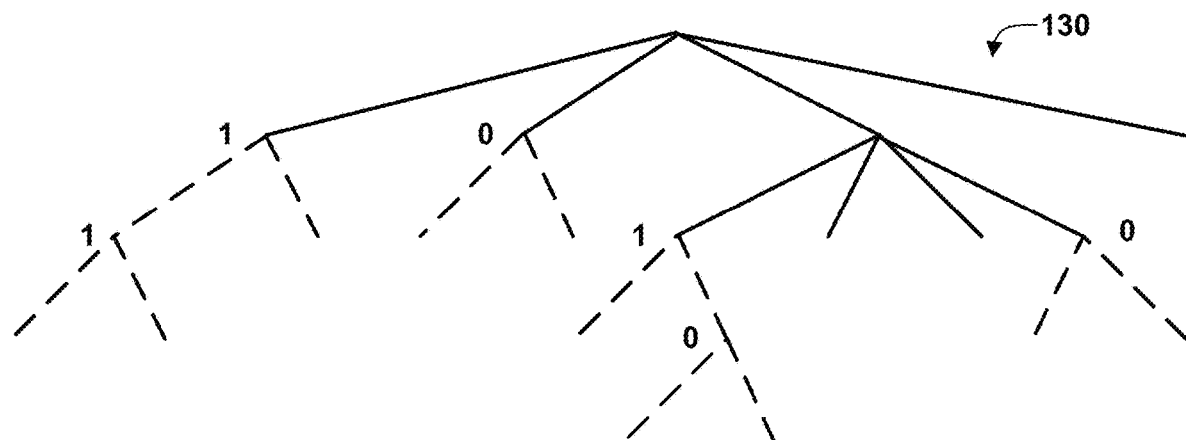
FIGS. 2A and 2B are conceptual diagrams illustrating an example quadtree binary tree (QTBT) structure, and a corresponding coding tree unit (CTU).
Figure 2B:
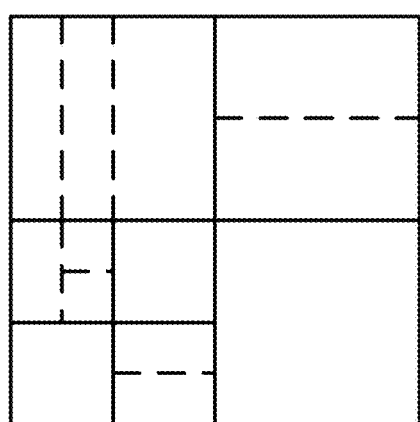

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBT-Size) or the maximum allowed binary tree depth (MaxBT-Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
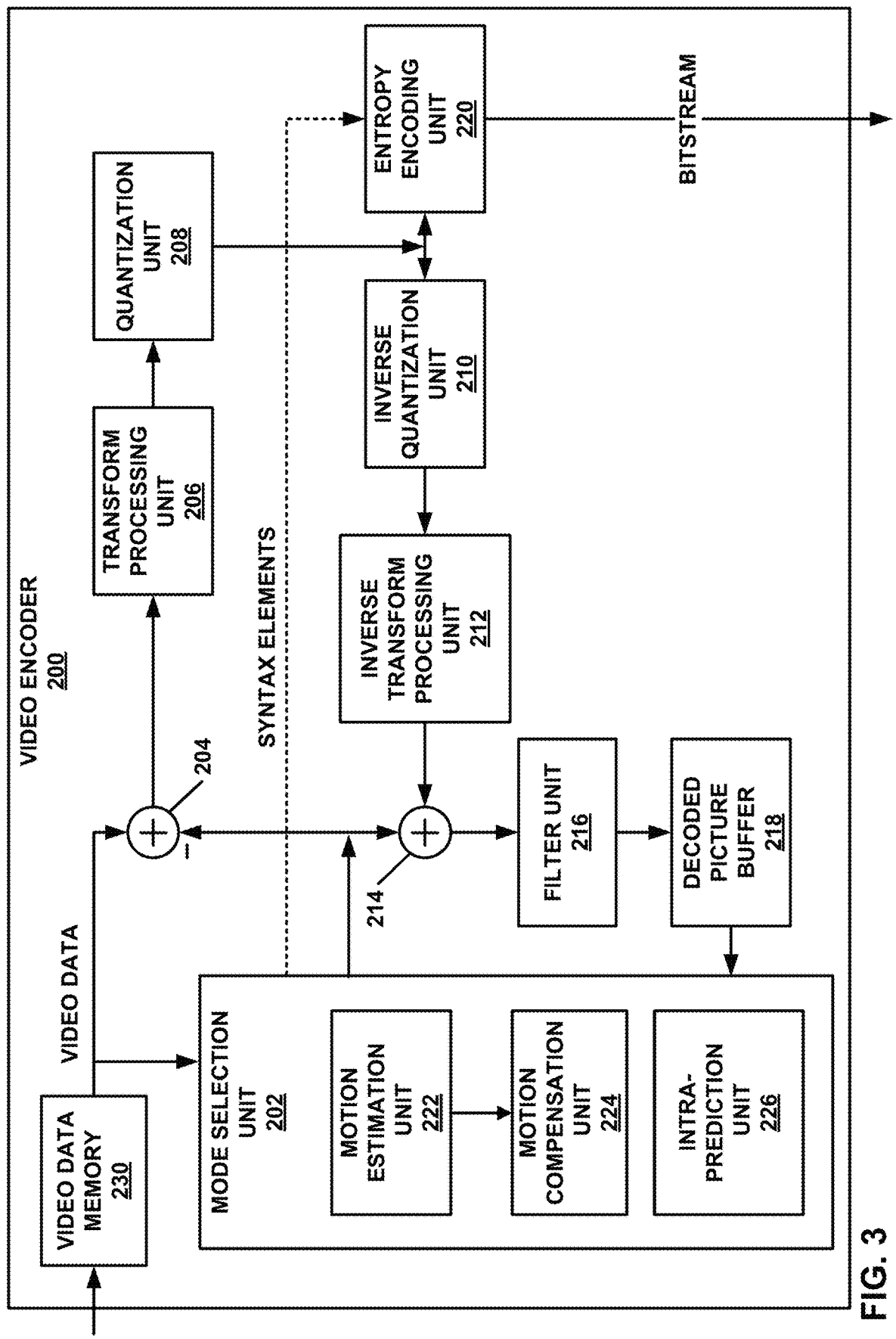
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may be configured to perform the various techniques of this disclosure relating to ALF and CC-ALF. For example, filter unit 216 may determine that a chroma sample of a decoded chroma block is on a first side of an adaptive loop filter (ALF) virtual boundary and that a co-located luma sample of a decoded luma block is on a second side of the ALF virtual boundary, where the co-located luma sample is co-located with the chroma sample, and the first side is different than the second side. In response to this determination, filter unit 216 may disable CC-ALF for the chroma sample. For example, in VVC, the position of an ALF virtual boundary is 4 luma lines and 2 chroma lines above a horizontal CTU boundary.

Additionally or alternatively, filter unit 216 may determine that a chroma sample of a decoded chroma block is on a first side of a CC-ALF virtual boundary and that a co-located luma sample of a decoded luma block is on a second side of the CC-ALF virtual boundary, where the co-located luma sample is co-located with the chroma sample. In response, filter unit 216 may perform CC-ALF filtering of the chroma sample using a replaced luma sample instead of the co-located luma sample, as discussed in greater detail below, e.g., with respect to FIGS. 12-14.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

As described above, video encoder 200 may be configured to perform cross-component adaptive loop filtering (e.g., such as with filter unit 216). Example of cross-component adaptive loop filtering is described below in more detail, including possible issues and examples of techniques to overcome the issues. For example, video encoder 200 (e.g., via filter unit 216) represents an example of a video encoding device including a memory configured to store video data, and one or more processing units implemented in circuitry and configured to determine that one or more luma samples used for cross-component adaptive loop filtering a chroma sample are unavailable, and at least one of: (1) replace the one or more unavailable luma samples with one or more available luma samples and perform cross-component adaptive loop filtering on the chroma sample with the one or more available luma samples, (2) perform cross-component adaptive loop filtering on the chroma sample without replacing the one or more unavailable luma samples, or (3) bypass performing cross-component adaptive loop filtering on the chroma sample.

Figure 10:
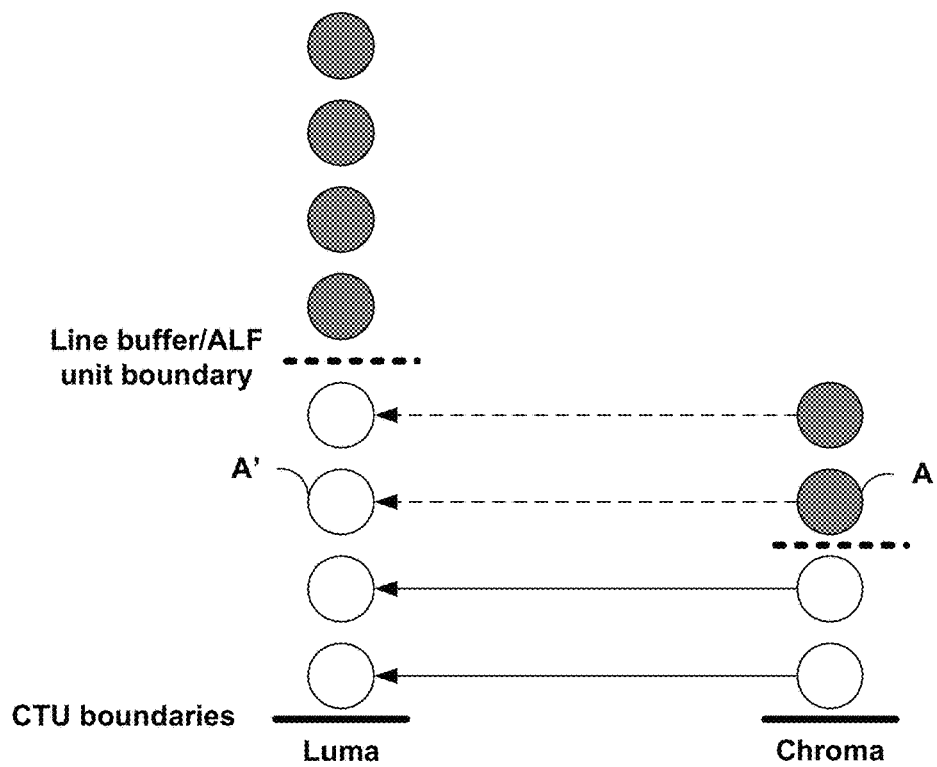
FIGS. 10 and 11 are conceptual diagrams illustrating undefined CC-ALF behavior when current chroma sample and its co-located luma sample are in different ALF units.

In this manner, video encoder 200 represents an example of a device for decoding video data that includes a memory configured to store video data; and one or more processors implemented in circuitry and configured to: decode a coding tree unit (CTU) of the video data, the CTU including a luminance (luma) block and a chrominance (chroma) block, to produce a decoded luma block and a decoded chroma block; determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side (e.g., as shown in FIG. 10, discussed in greater detail below), disable cross-component adaptive loop filtering (CC-ALF) for the chroma sample. For example, in VVC, for 4:4:4 and 4:2:2 video sequences, CC-ALF is disabled for chroma samples in the third and fourth lines above a horizontal CTU boundary.

Figure 4:
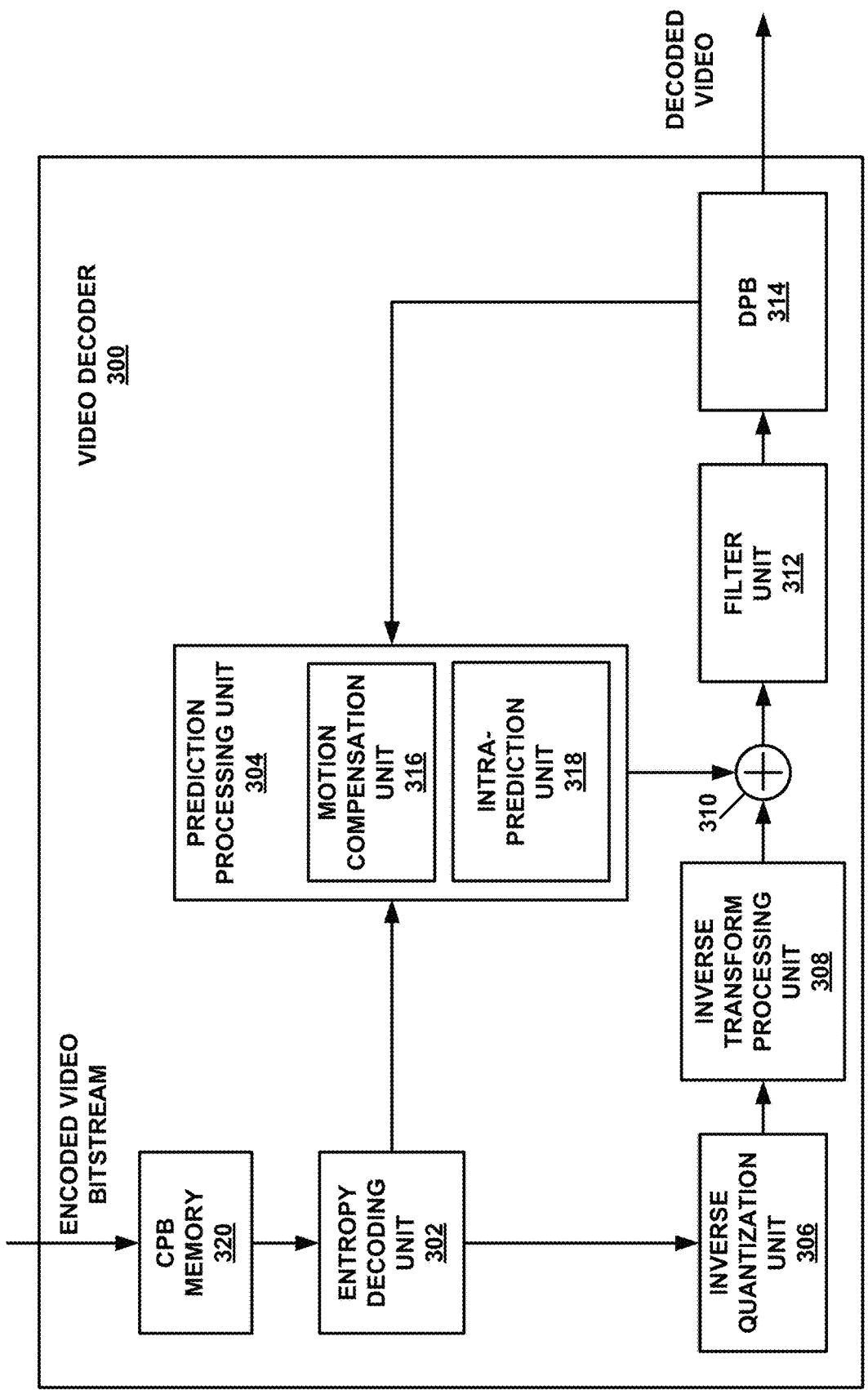
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. Filter unit 312 may be configured to perform the various techniques of this disclosure relating to ALF and CC-ALF. For example, filter unit 312 may determine that a chroma sample of a decoded chroma block is on a first side of an adaptive loop filter (ALF) virtual boundary and that a co-located luma sample of a decoded luma block is on a second side of the ALF virtual boundary, where the co-located luma sample is co-located with the chroma sample, and the first side is different than the second side. In response to this determination, filter unit 312 may disable CC-ALF for the chroma sample.

Additionally or alternatively, filter unit 312 may determine that a chroma sample of a decoded chroma block is on a first side of a CC-ALF virtual boundary and that a co-located luma sample of a decoded luma block is on a second side of the CC-ALF virtual boundary, where the co-located luma sample is co-located with the chroma sample. In response, filter unit 312 may perform CC-ALF filtering of the chroma sample using a replaced luma sample instead of the co-located luma sample, as discussed in greater detail below, e.g., with respect to FIGS. 12-14.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

As described above, video decoder 300 may be configured to perform cross-component adaptive loop filtering (e.g., such as with filter unit 312). Example of cross-component adaptive loop filtering is described below in more detail, including possible issues and examples of techniques to overcome the issues. For example, video decoder 300 (e.g., via filter unit 312) represents an example of a video decoding device including a memory configured to store video data, and one or more processing units implemented in circuitry and configured to determine that one or more luma samples used for cross-component adaptive loop filtering a chroma sample are unavailable, and at least one of: (1) replace the one or more unavailable luma samples with one or more available luma samples and perform cross-component adaptive loop filtering on the chroma sample with the one or more available luma samples, (2) perform cross-component adaptive loop filtering on the chroma sample without replacing the one or more unavailable luma samples, or (3) bypass performing cross-component adaptive loop filtering on the chroma sample.

In Misra, et. al. "Cross-Component Adaptive Loop Filter for chroma," Joint Video Experts Team (JEVT) of ITU-T SG 16 WP 3 and ISO/IED JTC 1/SC 29/WG 11, 15$^{th}$ Meeting: Gothenburg, SE 3-12 Jul. 2019, JVET-O0636 (hereinafter "WET-O0636"), a tool called cross-component adaptive loop filter (CC-ALF) is proposed. CC-ALF operates as part of adaptive loop filter (ALF) and makes used of luma samples to refine each chroma component. The tool is controlled by information in the bit-stream, and this information includes filter coefficients for each chroma component (signaled in adaptation parameter set (APS)) and a mask controlling the application of the filter for blocks of samples.

In this manner, video decoder 300 represents an example of a device for decoding video data that includes a memory configured to store video data; and one or more processors implemented in circuitry and configured to: decode a coding tree unit (CTU) of the video data, the CTU including a luminance (luma) block and a chrominance (chroma) block, to produce a decoded luma block and a decoded chroma block; determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disable cross-component adaptive loop filtering (CC-ALF) for the chroma sample.

Figure 5:
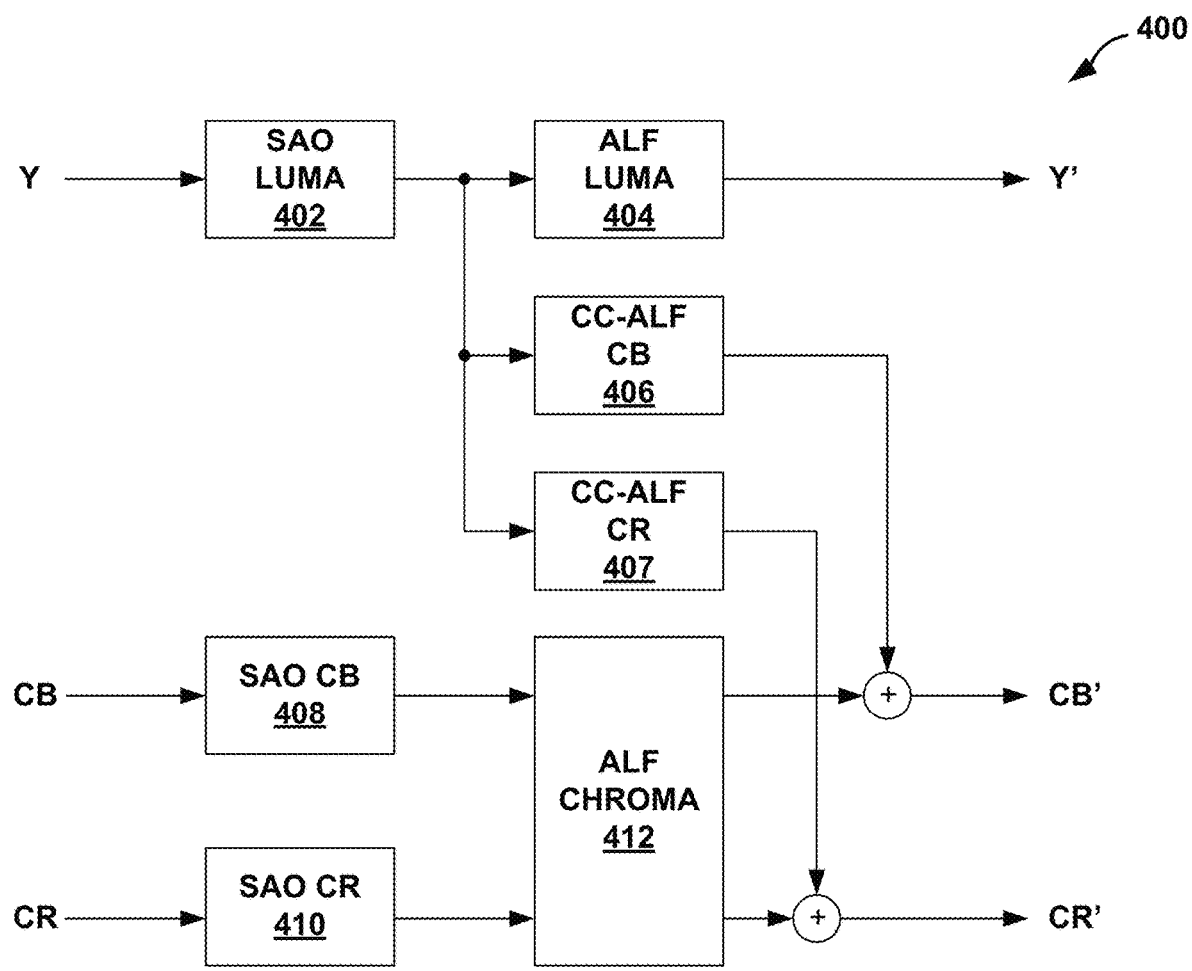
FIG. 5 is a block diagram illustrating a cross-component adaptive loop filter (CC-ALF) reconstruction stage.

FIG. 5 is a block diagram illustrating a cross-component adaptive loop filter (CC-ALF) reconstruction stage. FIG. 5 depicts filter unit 400, which represents an example of filter unit 216 of FIG. 3 or filter unit 312 of FIG. 4. As illustrated in FIG. 5, ALF luma unit 404 receives SAO-filtered luma samples (Y) from SAO (sample adaptive offset) luma unit 402, and ALF luma unit 404 performs adaptive loop filtering on the luma samples. ALF chroma unit 412 receives SAO-filtered blue hue chroma samples (CB) from SAO CB unit 408 and receives SAO-filtered red hue chroma samples (CR) from SAO CR unit 410, and ALF chroma unit 412 performs adaptive loop filtering on the chroma samples.

CC-ALF CB unit 406 and CC-ALF CR unit 407 each perform operations on luma samples to generate refinement values that are added to the respective output of ALF chroma unit 412. In this way, luma samples are used as part of the adaptive loop filtering of chroma samples (e.g. by refining the result of the adaptive loop filtering). Thus, when filter unit 400 performs CC-ALF, filter unit 400 outputs CC-ALF filtered luma samples (Y'), blue-hue chroma samples (CB') and red hue chroma samples (CR'). However, as described in more detail, there may be issues with such cross-component adaptive loop filtering, and CC-ALF CB unit 406 and CC-ALF CR unit 407 may be configured to perform techniques of this disclosure to address these issues. For example, if the luma samples are on one side of an ALF virtual boundary and co-located chroma samples are on the other side of the ALF virtual boundary, filter unit 400 may disable CC-ALF for the chroma samples.

It should be understood that CC-ALF CB unit 406 and CC-ALF CR unit 407 performing the example techniques is described as merely one example and should not be considered limiting. Various components of filter unit 400 or some combination of filter unit 400 and components of video encoder 200 and video decoder 300 may be configured to perform the example techniques described in this disclosure.

Moreover, ALF luma unit 404 and ALF chroma unit 412 are illustrated as receiving luma and chroma samples that have been filtered with SAO luma unit 402, SAO CB unit 408, and SAO CR unit 410, respectively. However, in some examples, there may be no sample adaptive offset filtering. Also, although deblock filtering is not illustrated, in some examples, the luma and chroma samples may be deblock filtered prior to SAO or ALF or subsequent to SAO or ALF.

FIG. 5 illustrates that the refinement for the chroma samples occurs after ALF chroma unit 412. However, in some examples, the refinement may be performed prior to operations by ALF chroma unit 412 (i.e., ALF chroma unit 412 receives refined chroma samples that are adaptive loop filtered).

In JVET-O0636, each filter coefficient is represented as a fixed-point decimal number. For example, a filter coefficient uses lower 10 bits to represent the decimal part. Each coefficient is signaled with exponential-Golomb (EG) coding whose order depends on the coefficient position in the filter template.

Figures 6, 7:
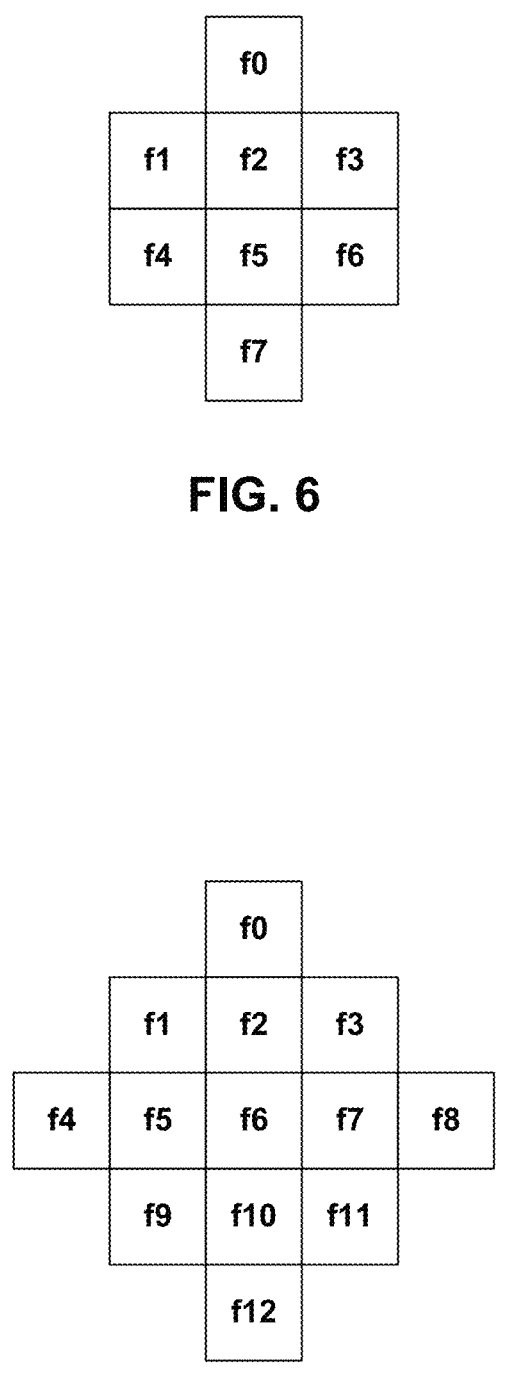

Multiple filter shapes can be used for CC-ALF. For example, in Misra, et al. "CE5-related: On the design of CC-ALF," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, WET-P1008 (hereinafter "JVET-P1008), a 4×3 filter is used for CC-ALF, as shown in FIG. 6. In Hu, et al. "CE5-related: Reduced filter shape for cross component adaptive loop filter," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P0558 (hereinafter "JVET-P0558") and U.S. Provisional Application No. 62/897,627, filed Sep. 9, 2019, a 5×5 filter is used for CC-ALF, as shown in FIG. 7.

When applying CC-ALF to a chroma sample, luma samples around the co-located luma sample (e.g., neighboring samples selected according to a CC-ALF-defined pattern around the co-located luma sample) may be used in a way that the co-located luma sample may be in the center of the pattern. For example, in the filter shape (pattern) shown in FIG. 6, a co-located luma sample is mapped to the position f2 in the filter. In the filter shape shown in FIG. 7, co-located luma sample is mapped to the position f6 in the filter.

In the design of a decoder (e.g., video decoder 300) for a video coding standard, when reconstructing a coding tree unit (CTU), some bottom lines of luma samples and some bottom lines of chroma samples in the top CTU are kept in line buffers due to the delay of deblocking filter and SAO, which needs samples from the current CTU.

For example, in a design of a VVC decoder, such as video decoder 300, when reconstructing a CTU, the bottom 4 lines of luma samples and 2 lines of chroma samples in the top CTU are kept as line buffer. To reduce the line buffer requirement, samples in an ALF unit may not (e.g., cannot) access samples in its above or below ALF unit when doing ALF. Therefore, an ALF processing unit (bordered by ALF virtual boundaries) is shifted upwards by 4 lines of luma samples and 2 lines of chroma samples.

Figure 8:
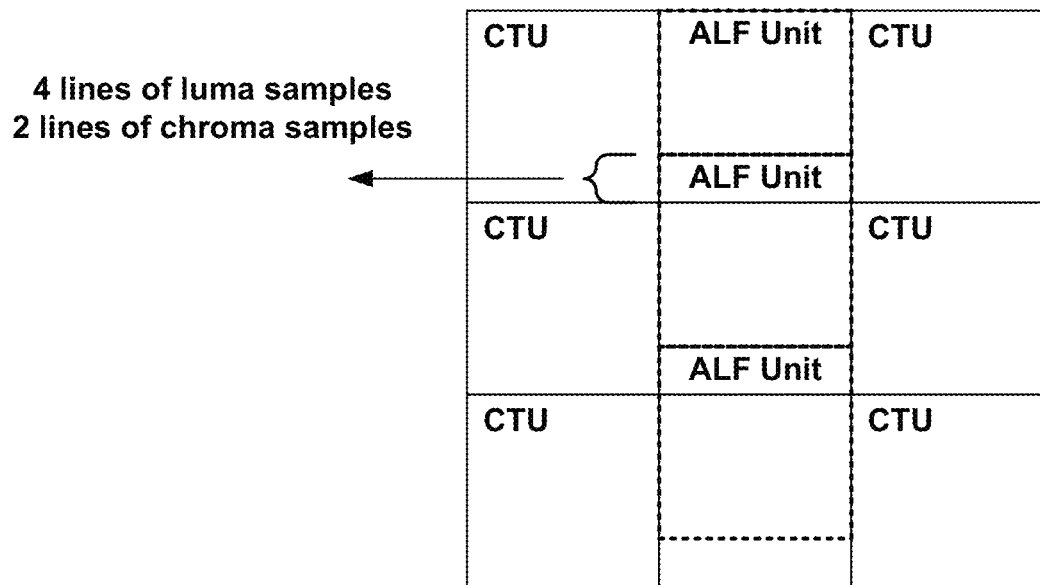
FIG. 8 is a conceptual diagram illustrating examples of ALF processing units where 4 lines of luma samples and 2 lines of chroma samples are above CTU boundaries.

For example, FIG. 8 is a conceptual diagram illustrating examples of ALF processing units where 4 lines of luma samples and 2 lines of chroma samples are above CTU boundaries. As illustrated in FIG. 8, the dashed lines represent line buffer/ALF unit boundary and the solid lines illustrate CTU boundaries. As shown, 4 lines of luma samples and 2 lines of chroma samples and 2 lines of chroma samples are above the CTU boundaries.

Similarly, in the design of a decoder (e.g., video decoder 300) for a video coding standard, when reconstructing a CTU, some right columns of luma and chroma samples from a left-neighboring CTU are kept as a column buffer. To reduce the column buffer memory requirements for ALF, samples in an ALF unit may not (e.g., cannot) refer to any sample in another ALF unit.

For example, when reconstructing a CTU, the bottom 4 lines of luma samples and 2 lines of chroma samples in the top CTU may be kept as line buffer. The right 4 columns of luma samples and 2 columns of chroma samples in the left CTU are kept as column buffer. Therefore, an ALF processing unit is shifted upwards by 4 lines of luma samples and 2 lines of chroma samples, and is shifted left by 4 columns of luma samples and 2 columns of chroma samples.

Figure 9:
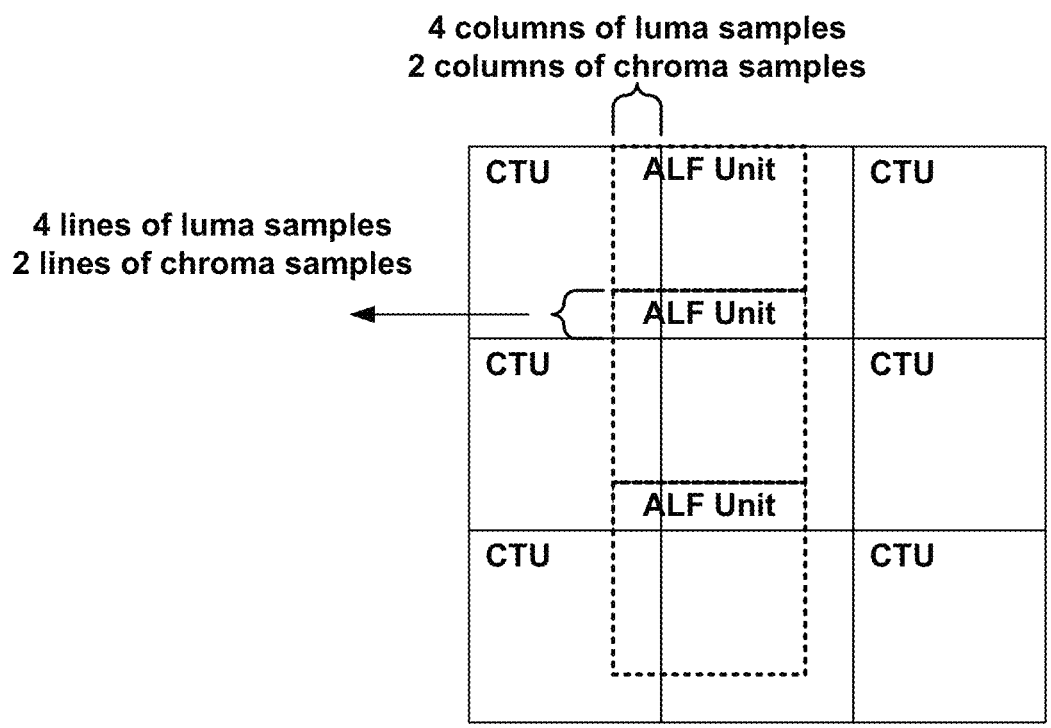
FIG. 9 is a conceptual diagram illustrating examples of ALF processing units where 4 lines of luma samples and 2 lines of chroma samples are above CTU boundaries and 4 columns of luma samples and 2 lines of chroma samples are left of CTU boundaries.

For example, FIG. 9 is a conceptual diagram illustrating examples of ALF processing units where 4 lines of luma samples and 2 lines of chroma samples are above CTU boundaries and 4 columns of luma samples and 2 lines of chroma samples are left of CTU boundaries. As illustrated in FIG. 9, the dashed lines represent line buffer/ALF unit boundary and the solid lines illustrate CTU boundaries. As shown, 4 lines of luma samples and 2 lines of chroma samples are above the CTU boundaries and 4 columns of luma samples and 2 lines of chroma samples are left of the CTU boundaries.

For some chroma sample format such as 4:2:2 and 4:4:4, if reconstruction is applied for each CTU line only, or ALF/CC-ALF units are interleaving processed, luma and chroma ALF units of the same CTU may not be aligned. It is possible that a chroma sample and its co-located luma sample are in different ALF units.

Figure 11:
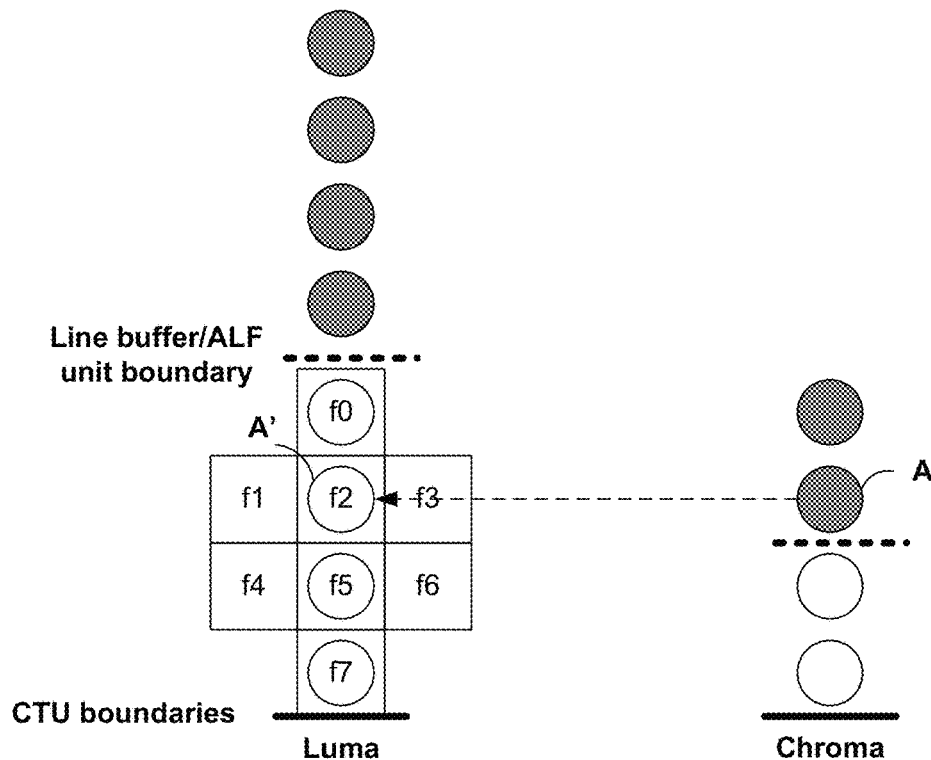

FIGS. 10 and 11 are conceptual diagrams illustrating undefined CC-ALF behavior when current chroma sample and its co-located luma sample are in different ALF units. That is, the conventional techniques do not address how to filter these samples in this situation. In FIGS. 10 and 11, when CC-ALF is applied to chroma sample A, its co-located luma sample A' is in a different ALF unit. For instance, A and A' are in different sides of ALF line buffer boundary. In this case, the behavior of CC-ALF may be undefined in the conventional techniques, because to run CC-ALF for A, some luma samples around A' and A' itself are waiting for a deblocking filter and SAO which is pending on the processing of lower CTU. Therefore, these luma samples are not available.

In some examples, the ALF line buffer position (virtual boundary position, ALF unit boundary position) in VVC Draft 8 is 4 lines of luma samples and 2 lines of chroma samples above a CTU boundary. In some examples, the ALF line buffer position may indicate which samples are available for CC-ALF. As described in more detail below, in some examples, the ALF line buffer may not be fixed and may be adaptive.

To address one or more of the issues described in this disclosure, this disclosure describes various example techniques. The example techniques should not be interpreted as being limited to solving the issues and may be utilized generally as part of video coding. Also, the example techniques may be used together or separately.

In one or more examples, when co-located luma samples or neighbor luma samples are located in a different ALF unit (e.g. located on different sides of the ALF line buffer boundary) compared to a chroma sample to be filtered, then such luma samples may be treated as unavailable, and may be replaced by available samples or be excluded from the CC-ALF filtering process.

As one example, when a chroma sample and its co-located luma sample are on different sides of ALF line buffer boundary, CC-ALF may be disabled. In VVC Draft 8, the CC-ALF equation is modified as shown below, with the additions being shown as bolded and italicized text between /+through +/.

The variable sum is derived as follows:

$$\begin{aligned}
\text{sum} = &f[0]*(recPicture_L[h_x][v_{y-yP1}] - recPicture_L[h_x][v_y]) + \\
&f[1]*(recPicture_L[h_{x-1}][v_y] - recPicture_L[h_x][v_y]) + \\
&f[2]*(recPicture_L[h_{x+1}][v_y] - recPicture_L[h_x][v_y]) + \\
&f[3]*(recPicture_L[h_{x-1}][v_{y+yP1}] - recPicture_L[h_x][v_y]) + \\
&f[4]*(recPicture_L[h_x][v_{y+yP1}] - recPicture_L[h_x][v_y]) + \\
&f[5]*(recPicture_L[h_{x+1}][v_{y+yP1}] - recPicture_L[h_x][v_y]) + \\
&f[6]*(recPicture_L[h_x][v_{y+yP2}] - recPicture_L[h_x][v_y])
\end{aligned} \quad (1532)$$

$$\begin{aligned}
\text{scaled Sum} = \text{Clip3}(&-1(1 \ll (\text{Bit Depth} - 1)), \\
&(1 \ll (\text{Bit Depth} - 1)) - 1(\text{sum} + 64) \gg 7)
\end{aligned} \quad (1533)$$

/+ If $y<\text{CtbSizeY}/\text{SubHeightC}-2$ and
$y*\text{SubHeightC}>=\text{CtbSizeY}-4$, scaledSum=0;+/

$$\text{sum}=\text{curr}+\text{scaledSum} \quad (1534)$$

The modified filtered reconstructed chroma picture sample CC-ALFPicture[xCtbC+x][yCtbC+y] is derived as follows:

$$CC\text{-ALFPicture}[x\text{CtbC}+x][y\text{CtbC}+y\pi]=\text{Clip3}(0, (1\ll\text{BitDepth})-1,\text{sum}) \quad (1535)$$

In the above and as used below, CtbSizeY represents the size of a luma coding tree block (CTB) in both width and height. SubHeightC and SubWidthC are indicative of the ratio of height or width between luma and chroma blocks, respectively. For instance, for 4:2:0 color format, SubHeightC and SubWidthC are both equal to 2 because the height and width of the luma block is twice the height and width of the luma block. For 4:2:2 color format, SubHeightC is equal to 1 and SubWidthC is equal to 2 because the height of the chroma block and the luma block is the same but the width of the luma block is twice the width of the chroma block.

Figure 12:
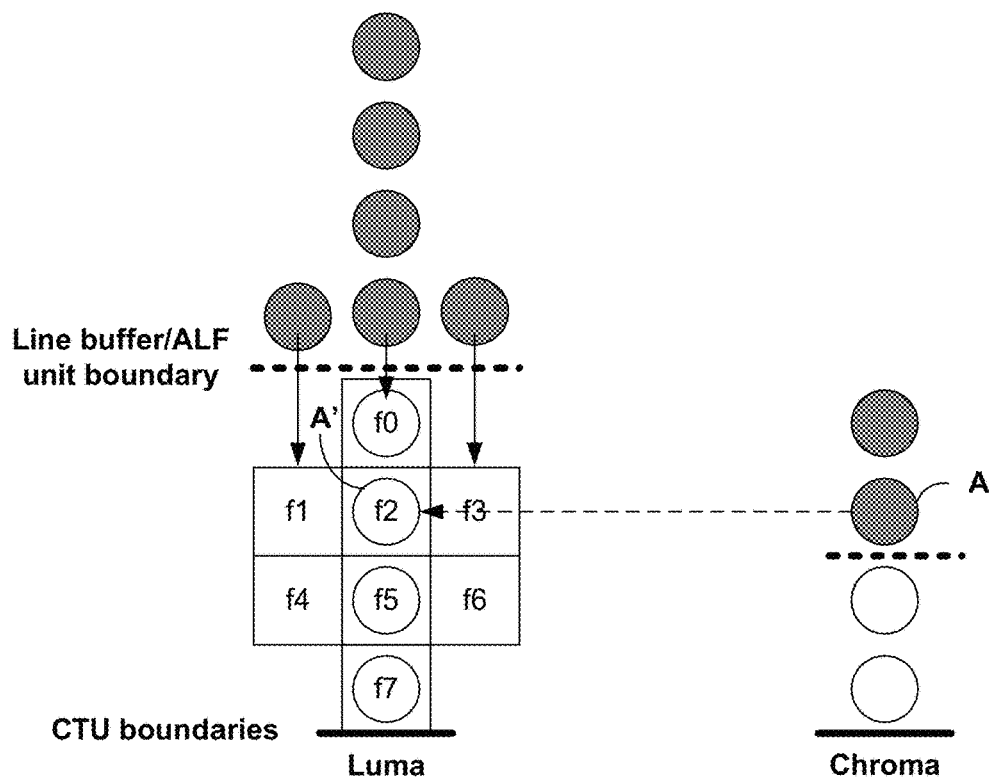
FIG. 12 is a conceptual diagram illustrating an example of unavailable luma pixels being padded by available luma samples with repetitive padding.

As one example, when a chroma sample and its co-located luma sample are on different sides of ALF line buffer boundary, closest luma samples in the same ALF line buffer side (same ALF unit) as the chroma sample may be padded to unavailable luma samples as shown in FIG. 12. For example, FIG. 12 is a conceptual diagram illustrating an example of unavailable luma pixels being padded by available luma samples with repetitive padding.

Figure 13:
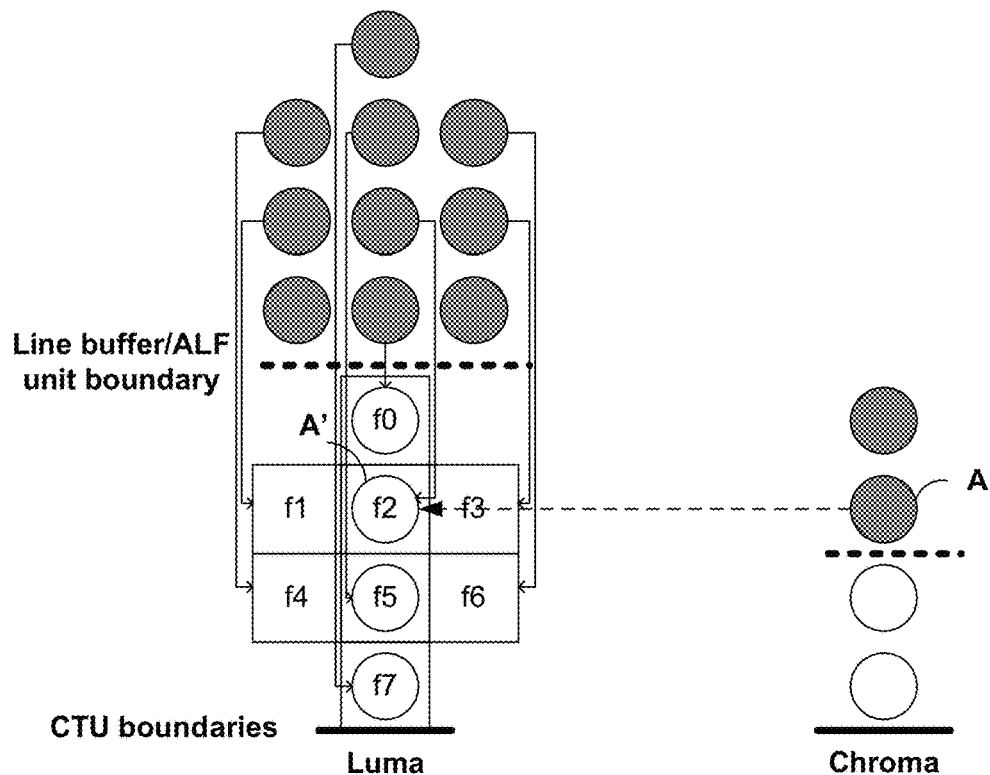
FIG. 13 is a conceptual diagram illustrating an example of mirrored padding.

As one example, when a chroma sample and its co-located luma sample are on different sides of ALF line buffer boundary, mirrored luma samples in the same ALF line buffer side (same ALF unit) as the chroma sample may be padded to unavailable luma samples shown in FIG. 13. For example, FIG. 13 is a conceptual diagram illustrating an example of mirrored padding.

Figure 14:
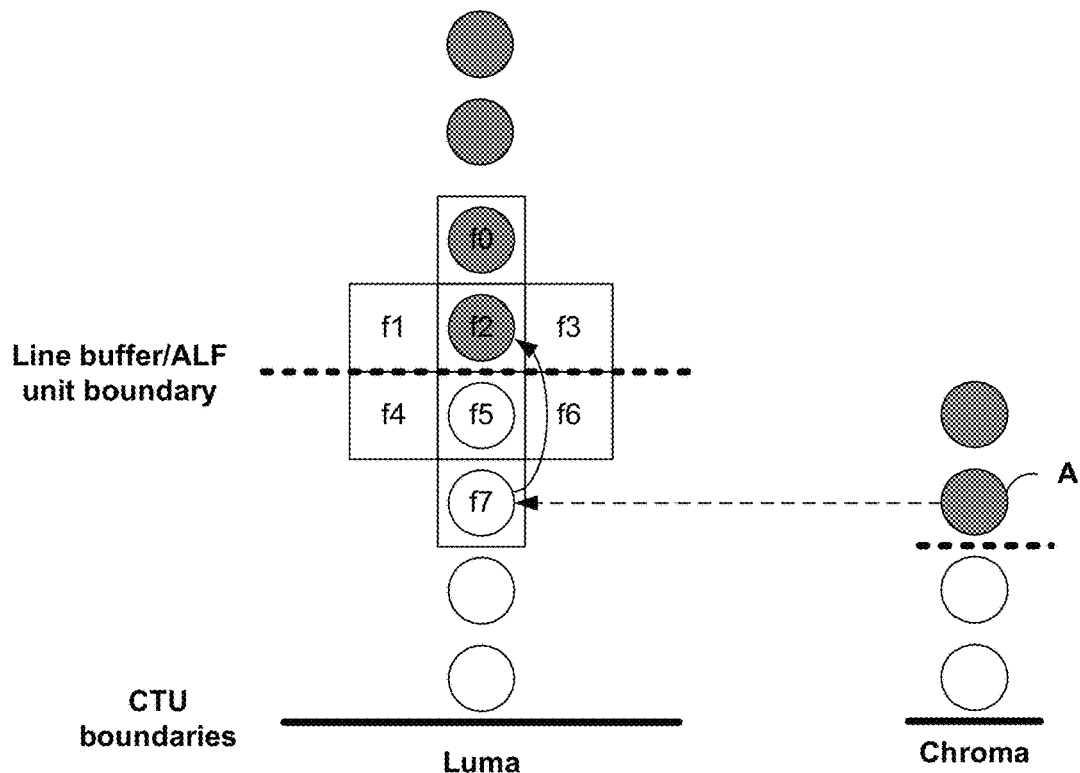
FIG. 14 is a conceptual diagram illustrating an example of closest luma sample in the same ALF line buffer side being used as new co-located luma sample.

As one example, when a chroma sample and its co-located luma sample are on different sides of ALF line buffer boundary, the closest luma sample in the same ALF line buffer side (same ALF unit) as the chroma sample may be used as the new co-located luma sample, as shown in FIG. 14. For example, FIG. 14 is a conceptual diagram illustrating an example of closest luma sample in the same ALF line buffer side being used as new co-located luma sample. In VVC Draft 8 section 8.8.5.7, yL determines the vertical position of luma sample of current chroma sample. In some examples, yL may be clipped as follows: If y<CtbSizeY/SubHeightC−2 and y*SubHeightC>=CtbSizeY−4, yL is set equal to yCtbC*SubHeightC+CtbSizeY−5. The coordinate (xCtbC, yCtbC) defines a location of a chroma coding tree block (CTB).

Figure 15:
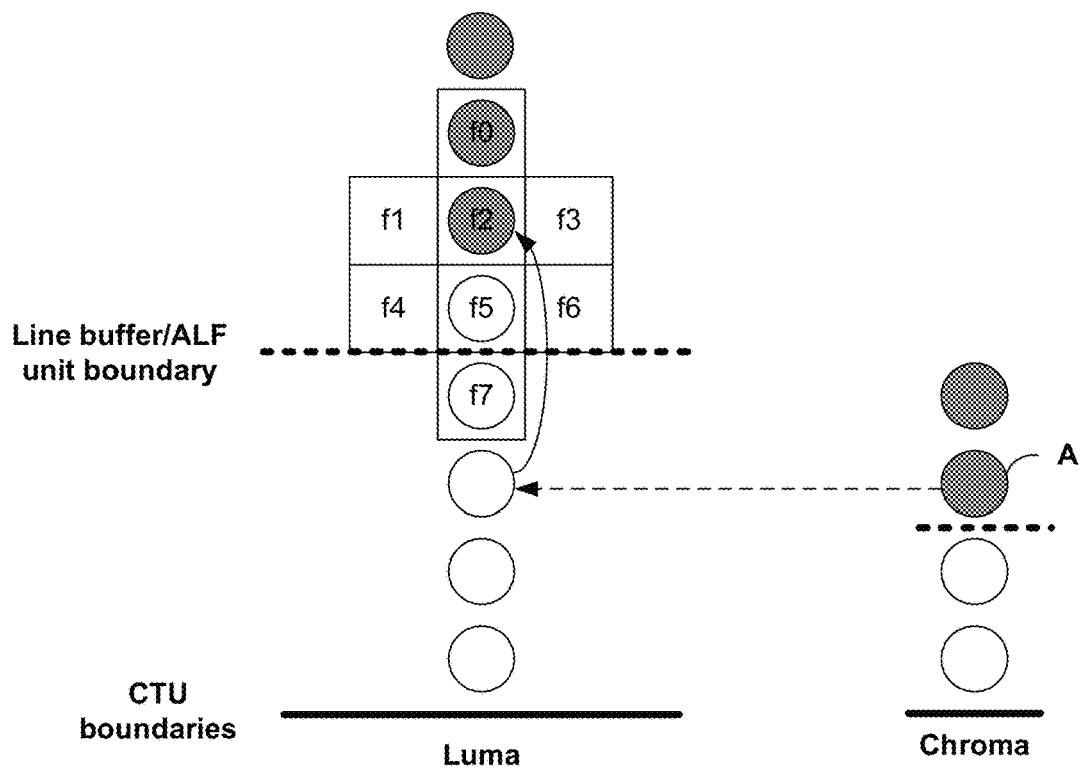
FIG. 15 is a conceptual diagram illustrating an example of mirrored luma sample in same ALF line side being used as new co-located luma sample.

As one example, when a chroma sample and its co-located luma sample are on different sides of ALF line buffer boundary, the mirrored luma sample in the same ALF line buffer side (same ALF unit) as the chroma sample may be used as the new co-located luma sample, as shown in FIG. 15. For example, FIG. 15 is a conceptual diagram illustrating an example of mirrored luma sample in same ALF line side being used as new co-located luma sample. In VVC Draft 8 section 8.8.5.7, yL determines the vertical position of luma sample of current chroma sample. In some examples, yL may be clipped as follows: If y<CtbSizeY/SubHeightC−2 and y*SubHeightC is equal to CtbSizeY−4, yL is set equal to yCtbC*SubHeightC+CtbSizeY−5; else if y<CtbSizeY/SubHeightC−2 and y*SubHeightC is equal to CtbSizeY−3, yL is set equal to yCtbC*SubHeightC+CtbSizeY−6.

Figure 16:
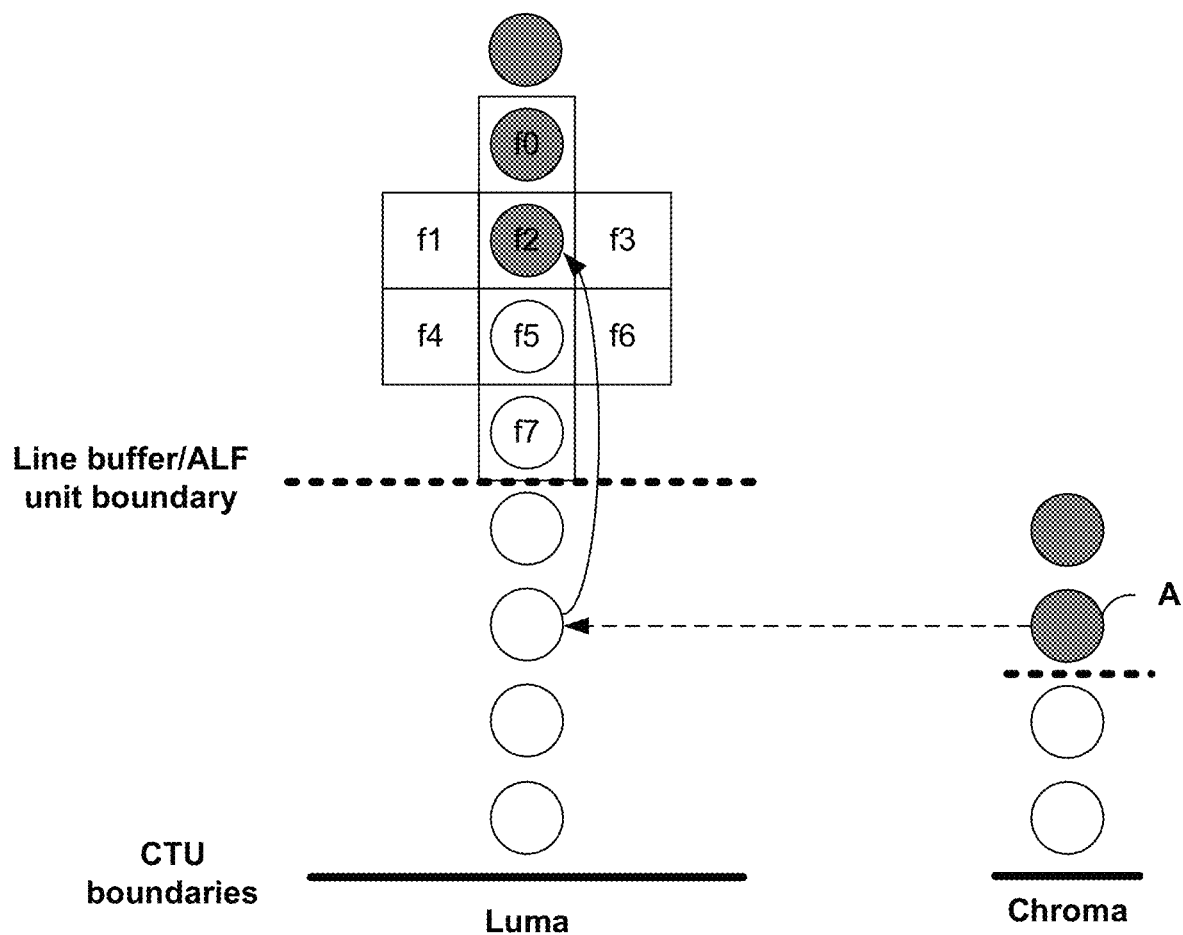
FIG. 16 is a conceptual diagram illustrating an example of closest luma sample in same ALF line buffer being used as new co-located luma sample.

As one example, when a chroma sample and its co-located luma sample are on different sides of an ALF line buffer boundary (also referred to as an ALF virtual boundary), the closest luma sample in the same ALF line buffer side (same ALF unit) as the chroma sample may be used as the new co-located luma sample, such that all luma pixels in the filter shape are in the same ALF line buffer side (same ALF unit) as the chroma sample, as shown in FIG. 16. For example, FIG. 16 is a conceptual diagram illustrating an example of closest luma sample in same ALF line buffer being used as new co-located luma sample such that all luma samples in the filter shape are in the same ALF line buffer side (same ALF unit) as the chroma sample. In VVC Draft 8 section 8.8.5.7, yL determines the vertical position of a luma sample of a corresponding current chroma sample. In some examples, yL may be clipped as follows: If y<CtbSizeY/SubHeightC−2 and y*SubHeightC>=CtbSizeY−4, yL is set equal to yCtbC*SubHeightC+CtbSizeY−7.

As one example, when a chroma and its co-located luma samples are on different sides of ALF line buffer boundary, the unavailable luma samples may be filled with some predefined/fixed values. The predefined/fixed values may be fixed for all video sequences or may be signaled at sequence/group of picture/APS/slice/tile/tile groups/brick/block level.

As one example, a different number of chroma line buffers may be used for different chroma subsampling format. For example, for 4:2:2 and 4:4:4 formats, 4 lines of chroma samples above a CTU may be stored. For other chroma subsampling formats, 2 lines of chroma samples above a CTU may be stored.

In some examples, the line buffer boundary (virtual boundary) position for chroma ALF may be adaptive to chroma format. For example, for 4:2:2 and 4:4:4 formats, the virtual boundary position for chroma ALF is 4 lines of chroma samples above a CTU. For other chroma subsampling formats, the virtual boundary position for chroma ALF is 2 lines of chroma samples above a CTU.

In VVC Draft 8, chroma ALF may be changed as follows, where the addition is shown as bold and italicized text between /+ and +/.

The variable sum is derived as follows:

$$\begin{aligned}
\text{sum} = {} & f[0] * (\text{Clip3}(-c[0], c[0], \text{recPicture}[h_x][v_{y+y2}] - \text{curr}) + \\
& \text{Clip3}(-c[0], c[0], \text{recPicture}[h_x][v_{y-y2}] - \text{curr})) + \\
& f[1] * (\text{Clip3}(-c[1], c[1], \text{recPicture}[h_{x+1}][v_{y+y1}] - \text{curr}) + \\
& \text{Clip3}(-c[1], c[1], \text{recPicture}[h_{x-1}][v_{y-y1}] - \text{curr})) + \\
& f[2] * (\text{Clip3}(-c[2], c[2], \text{recPicture}[h_x][v_{y+y1}] - \text{curr}) + \\
& \text{Clip3}(-c[2], c[2], \text{recPicture}[h_x][v_{y-y1}] - \text{curr})) + \\
& f[3] * (\text{Clip3}(-c[3], c[3], \text{recPicture}[h_{x-1}][v_{y+y1}] - \text{curr}) + \\
& \text{Clip3}(-c[3], c[3], \text{recPicture}[h_{x+1}][v_{y-y1}] - \text{curr})) + \\
& f[4] * (\text{Clip3}(-c[4], c[4], \text{recPicture}[h_{x+2}][v_y] - \text{curr}) + \\
& \text{Clip3}(-c[4], c[4], \text{recPicture}[h_{x-2}][v_y] - \text{curr})) + \\
& f[5] * (\text{Clip3}(-c[5], c[5], \text{recPicture}[h_{x+1}][v_y] - \text{curr}) + \\
& \text{Clip3}(-c[5], c[5], \text{recPicture}[h_{x-1}][v_y] - \text{curr}))
\end{aligned} \quad (1507)$$

$$\text{sum} = \text{curr} + ((\text{sum} + 64) \gg \text{alfShiftC}) \quad (1508)$$

−/+ The alf line buffer position offset is set as:alfLineBufOffset=SubHeightC==1?−2:0+/

The modified filtered reconstructed chroma picture sample alfPicture[xCtbC+x][yCtbC+y] is derived as follows:

$$\text{alfPicture}[xCtbC+x][yCtbC+y] = \text{Clip3}(0, (1 \ll \text{BitDepth}) - 1, \text{sum}) \quad (1509)$$

TABLE 46

Specification of y1, y2 and alfShiftC according to the vertical chroma sample position y and applyAlfLineBufBoundary

| Condition | alfShiftC | y1 | y2 |
|---|---|---|---|
| ( y = = ctbHeightC − 2 /+ + alfLineBufOffset +/ \|\| y = = ctbHeightC − 3 /+ + alfLineBufOffset +/) && ( applyAlfLineBufBoundary = = 1 ) | 10 | 0 | 0 |
| ( y = = ctbHeightC − 1 /+ + alfLineBufOffset +/ \|\| y = = ctbHeightC − 4 /+ + alfLineBufOffset +/) && ( applyAlfLineBufBoundary = = 1 ) | 7 | 1 | 1 |
| Otherwise | 7 | 1 | 2 |

As one example, when some luma samples are not available (e.g., located in a different ALF unit compared to the ALF unit of a chroma sample to be filtered), the sample values before deblocking filter may be used. In another example, all the samples in the filter shape may use the ones before deblocking filter.

In some examples, when some luma samples are not available (e.g., located in a different ALF unit compared to the ALF unit of a chroma sample to be filtered), different CC-ALF shape may be used for filtering, which only operate on the available luma samples. The examples of the new CC-ALF shapes may be different from the regular CC-ALF shape (i.e., having different number of coefficients). In one or more of such examples, the needed filter coefficients for the new CC-ALF shaped may be derived differently (i.e., for the different number of coefficients), or the coefficients for the regular CC-ALF shape may be repurposed, by merging some of the coefficients, for example to merge with the center coefficients.

When column buffers are used, the co-located luma sample of a chroma sample may be in a different ALF unit as well. Video encoder 200 and video decoder 300 may perform the example techniques described above but with respect to a column buffer. In some examples, where both line and column buffers are used, video encoder 200 and video decoder 300 may perform the example techniques described above but with respect to line or column buffer (including line and column buffer).

Figure 17:
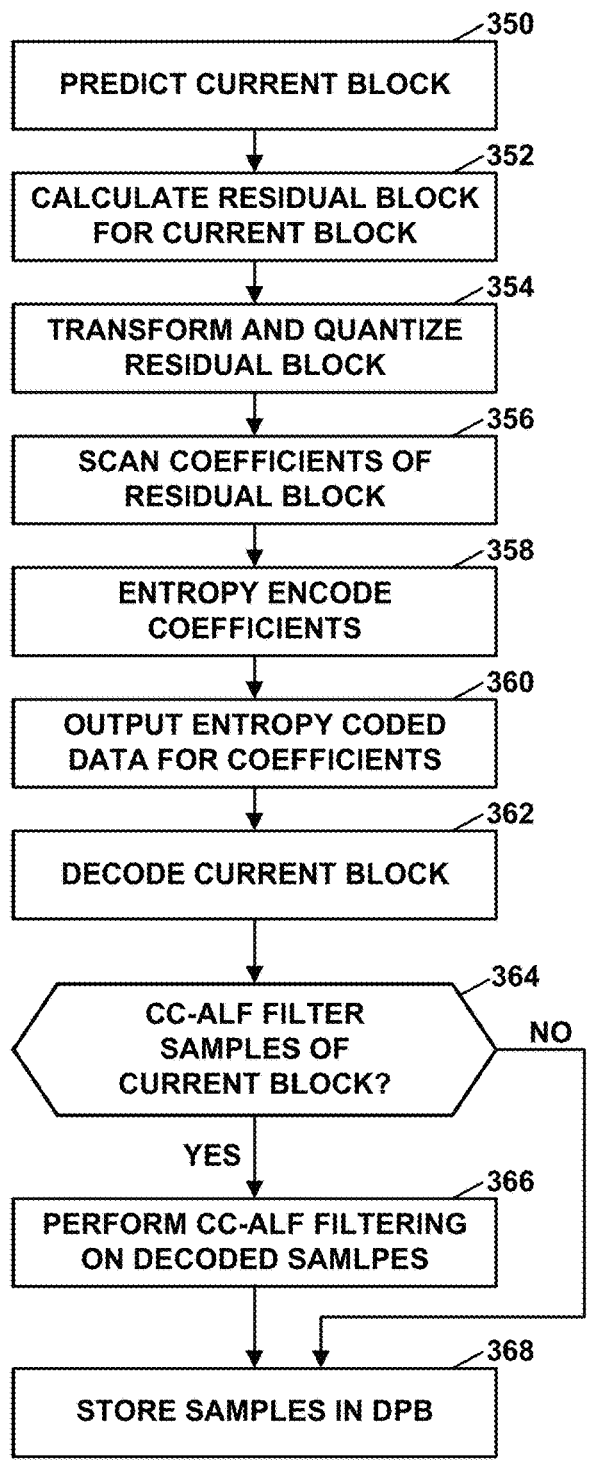
FIG. 17 is a flowchart illustrating an example method for encoding a current block of video data.

FIG. 17 is a flowchart illustrating an example method for encoding a current block. The current block may comprise a current CU. Although described with respect to video encoder 200 (FIGS. 1 and 3), it should be understood that other devices may be configured to perform a method similar to that of FIG. 17.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

In addition, video encoder 200 may also decode the current block (362). For example, video encoder 200 may inverse quantize and inverse transform the quantized transform coefficients, using inverse quantization unit 210 and inverse transform processing unit 212 (FIG. 3) to reproduce a residual block. Reconstruction unit 214 may combine the prediction block with the reproduced residual block.

Using the techniques of this disclosure, video encoder 200 may determine whether to perform CC-ALF filtering of samples of a decoded chroma block (364) using samples of a corresponding decoded luma block. For example, filter unit 216 may determine, for a current chroma sample of the current block that is located on a first side of an ALF virtual boundary, that a co-located luma sample of a corresponding luma block is on a second (different) side of the ALF virtual boundary. In this instance, in one example, filter unit 216 may determine not to perform CC-ALF filtering of the current chroma sample. Alternatively, in a different example, filter unit 216 may determine to perform CC-ALF filtering but using a substituted luma sample for the co-located luma sample, e.g., as discussed above (using padding, mirroring, or the like).

In response to determining to perform CC-ALF filtering on the decoded samples ("YES" branch of 364), filter unit 216 may perform CC-ALF filtering on the decoded samples (366). However, in response to determining not to perform CC-ALF filtering on the decoded samples ("NO" branch of 364), filter unit 216 may disable CC-ALF filtering for the current chroma sample. In either case, video encoder 200 may store the (potentially CC-ALF filtered) samples in DPB 218 (368), e.g., to use as reference for subsequent prediction.

In this manner, the method of FIG. 17 represents an example of a method of decoding video data that includes decoding a coding tree unit (CTU) of video data, the CTU including a luminance (luma) block and a chrominance (chroma) block, to produce a decoded luma block and a decoded chroma block; determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disabling cross-component adaptive loop filtering (CC-ALF) for the chroma sample.

Figure 18:
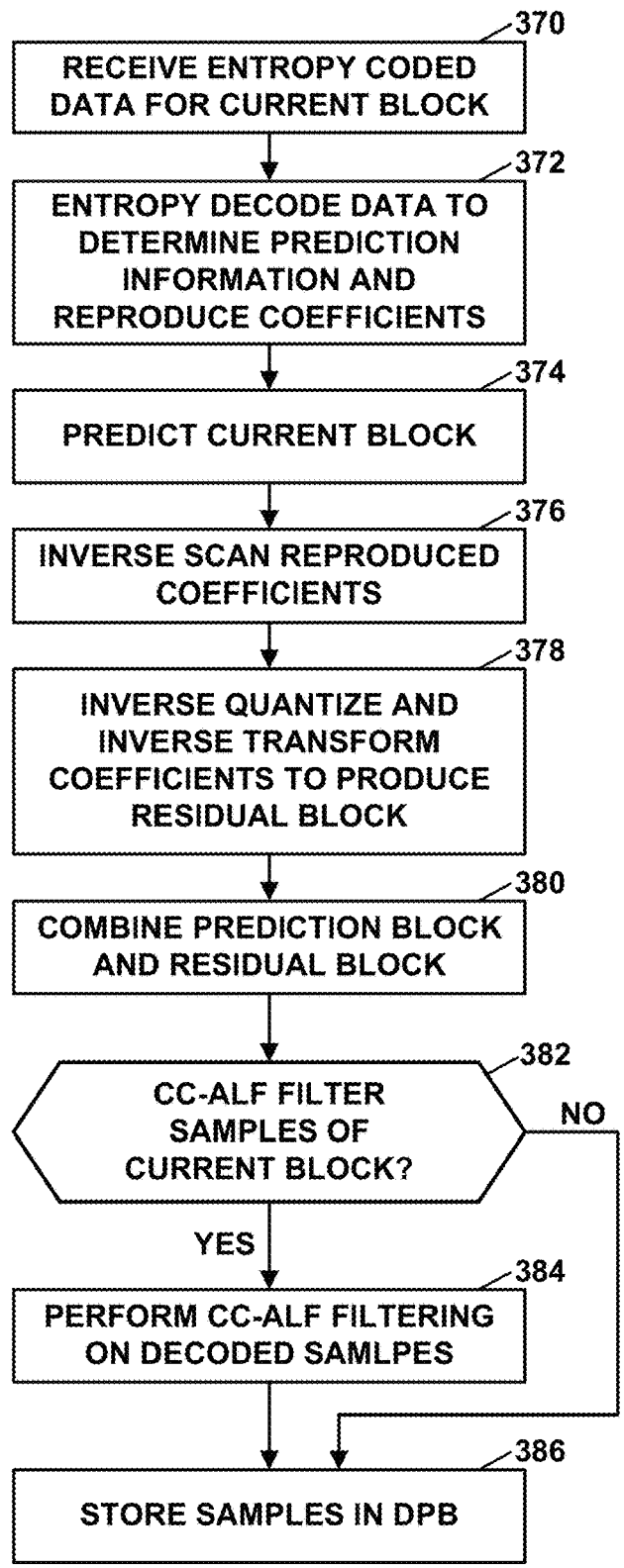
FIG. 18 is a flowchart illustrating an example method for decoding a current block of video data.

FIG. 18 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 18.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Using the techniques of this disclosure, video decoder 300 may determine whether to perform CC-ALF filtering of samples of a decoded chroma block (382). For example, filter unit 312 may determine, for a current chroma sample of the current block that is located on a first side of an ALF virtual boundary, that a co-located luma sample of a corresponding luma block is on a second (different) side of the ALF virtual boundary. In this instance, in one example, filter unit 312 may determine not to perform CC-ALF filtering of the current chroma sample. Alternatively, in a different example, filter unit 312 may determine to perform CC-ALF filtering but using a substituted luma sample for the co-located luma sample, e.g., as discussed above (using padding, mirroring, or the like).

In response to determining to perform CC-ALF filtering on the decoded samples ("YES" branch of 382), filter unit 312 may perform CC-ALF filtering on the decoded samples (384). However, in response to determining not to perform CC-ALF filtering on the decoded samples ("NO" branch of 382), filter unit 312 may disable CC-ALF filtering for the current chroma sample. In either case, video decoder 300 may store the (potentially CC-ALF filtered) samples in DPB 218 (386), e.g., to use as reference for subsequent prediction.

In this manner, the method of FIG. 18 represents an example of a method of decoding video data that includes decoding a coding tree unit (CTU) of video data, the CTU including a luminance (luma) block and a chrominance (chroma) block, to produce a decoded luma block and a decoded chroma block; determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disabling cross-component adaptive loop filtering (CC-ALF) for the chroma sample.

Figure 19:
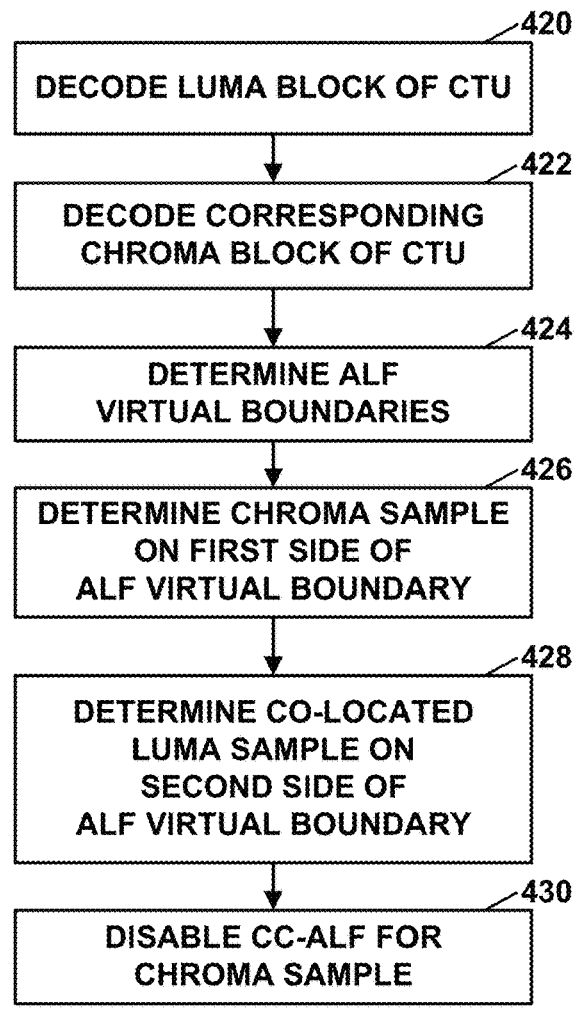
FIG. 19 is a flowchart illustrating an example method for decoding and filtering video data according to the techniques of this disclosure.

FIG. 19 is a flowchart illustrating an example method for decoding and filtering video data according to the techniques of this disclosure. For purposes of example and explanation, the method of FIG. 19 is explained with respect to video decoder 300 of FIG. 4. However, it should be understood that video encoder 200 and other encoding and/or decoding devices may perform this or a similar method.

Initially, video decoder 300 decodes a luminance (luma) block of a coding tree unit (CTU) (420). Video decoder 300 also decodes a chrominance (chroma) block of the CTU (422). The chroma block may be a blue-hue (CB) block or a red-hue (CR) block. The CTU may conform to one of a 4:4:4 format or a 4:2:2 format, in various examples. Thus, video decoder 300 may store luma samples of the luma block in a different line buffer than chroma samples of the chroma block, and video decoder 300 may clear the line buffer including the luma samples before filtering the chroma block.

Video decoder 300 may also determine ALF virtual boundaries in the chroma block and the luma block (424). Because of the CTU format (e.g., 4:4:4 or 4:2:2), video decoder 300 may determine that a chroma sample of the chroma block is on a first side of the ALF virtual boundary (426) and that a co-located luma sample of the luma block is on a second (different) side of the ALF virtual boundary (428). In response to these determinations (i.e., that the chroma sample and the co-located luma sample are on opposite sides of the ALF virtual boundary), video decoder 300 may disable CC-ALF for the chroma sample (430). Video decoder 300 may still perform other types of filtering, such as standard ALF, SAO, or the like.

In this manner, the method of FIG. 19 represents an example of a method of decoding video data that includes decoding a coding tree unit (CTU) of video data, the CTU including a luminance (luma) block and a chrominance (chroma) block, to produce a decoded luma block and a decoded chroma block; determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disabling cross-component adaptive loop filtering (CC-ALF) for the chroma sample.

Various techniques of this disclosure are summarized in the following clauses:

Clause 1: A method of filtering video data, the method comprising: determining that one or more luma samples of a current block used for cross-component adaptive loop filtering a chroma sample of the current block are unavailable; and at least one of: replacing the one or more unavailable luma samples with one or more available luma samples and performing cross-component adaptive loop filtering on the chroma sample with the one or more available luma samples; performing cross-component adaptive loop filtering on the chroma sample without replacing the one or more unavailable luma samples; or bypassing performing cross-component adaptive loop filtering on the chroma sample.

Clause 2: The method of clause 1, wherein determining that the one or more luma samples used for cross-component adaptive loop filtering the chroma sample are unavailable comprises: determining an adaptive loop filter (ALF) unit boundary; determining that the one or more luma samples used for cross-component adaptive loop filtering are on a first side of the ALF unit boundary; and determining that the chroma sample is on a second side of the ALF unit boundary.

Clause 3: The method of any of clauses 1 and 2, wherein determining that the one or more luma samples used for cross-component adaptive loop filtering the chroma sample are unavailable comprises: determining that a line or column buffer for storing the one or more luma samples used for cross-component adaptive loop filtering the chroma sample does not store the one or more luma samples.

Clause 4: The method of any of clauses 1-3, wherein replacing the one or more unavailable luma samples with one or more available luma samples comprises replacing the unavailable luma samples with luma samples that are closest to the unavailable luma samples and stored in a line or column buffer used for cross-component adaptive loop filtering.

Clause 5: The method of any of clauses 1-3, wherein replacing the one or more unavailable luma samples with one or more available luma samples comprises replacing the one or more unavailable luma samples with one or more mirror luma samples stored in a line or column buffer used for cross-component adaptive loop filtering.

Clause 6: The method of any of clauses 1-3, wherein replacing the one or more unavailable luma samples with one or more available luma samples comprises replacing an unavailable luma sample that is co-located with the chroma sample with a luma sample that is closest to the co-located unavailable luma sample and stored in a line or column buffer used for cross-component adaptive loop filtering.

Clause 7: The method of any of clauses 1-3, wherein replacing the one or more unavailable luma samples with one or more available luma samples comprises replacing an unavailable luma sample that is co-located with the chroma sample with a mirror luma sample stored in a line or column buffer used for cross-component adaptive loop filtering.

Clause 8: The method of any of clauses 1-3, wherein replacing the one or more unavailable luma samples with one or more available luma samples comprises replacing one or more of the unavailable luma samples with closest luma samples in same adaptive loop filter (ALF) unit as the chroma sample such that all luma samples used for cross-component adaptive loop filtering the chroma sample are in same ALF unit as the chroma sample.

Clause 9: The method of any of clauses 1-3, wherein replacing the one or more unavailable luma samples comprises replacing the one or more unavailable luma samples with predefined or fixed values.

Clause 10: The method of any of clauses 1-9, wherein the one or more available luma samples comprise one or more luma samples before deblocking filter is applied to the luma samples.

Clause 11: The method of any of clauses 1-10, wherein performing cross-component adaptive loop filtering on the chroma sample without replacing the one or more unavailable luma samples comprises performing cross-component adaptive loop filtering utilizing a first filter shape that is different than a second filter shape used when all luma samples are available.

Clause 12: The method of any of clauses 1-11, wherein replacing the one or more unavailable luma samples with one or more available luma samples and performing cross-component adaptive loop filtering on the chroma sample with the one or more available luma samples comprises replacing the one or more unavailable luma samples with one or more available luma samples having a vertical position, defined by yL, that is clipped according to one or more of the following:

If y<CtbSizeY/SubHeightC−2 and y*SubHeightC>=CtbSizeY−4, yL is set equal to yCtbC*SubHeightC+CtbSizeY−5;

If y<CtbSizeY/SubHeightC−2 and y*SubHeightC is equal to CtbSizeY−4, yL is set equal to yCtbC*SubHeightC+CtbSizeY−5; else if y<CtbSizeY/SubHeightC−2 and y*SubHeightC is equal to CtbSizeY−3, yL is set equal to yCtbC*SubHeightC+CtbSizeY−6;

If y<CtbSizeY/SubHeightC−2 and y*SubHeightC>=CtbSizeY−4, yL is set equal to yCtbC*SubHeightC+CtbSizeY−7, wherein CtbSizeY represents the size of a luma coding tree block (CTB) in both width and height, SubHeightC is indicative of the ratio of height or width between luma and chroma blocks, and yCtbC is a y-coordinate of a chroma coding tree block.

Clause 13: The method of any of clauses 1-12, wherein the method of filtering video data is performed by a video encoder as part of storing video data in memory.

Clause 14: The method of any of clauses 1-12, wherein the method of filtering video data is performed by a video decoder as part of storing video data in memory and/or generating video data for display.

Clause 15: The method of any combination of clauses 1-14.

Clause 16: A device for filtering video data, the device comprising: a memory configured to store luma samples and a chroma sample for cross-component adaptive loop filtering; and processing circuitry coupled to the memory and configured to perform the method of any one of clauses 1-15.

Clause 17: The device of clause 16, wherein the device comprises one or more of a display configured to display decoded video data, a camera, a computer, a mobile device, a broadcast receiver device, or a set-top box.

Clause 18: The device of any of clauses 16 and 17, wherein the device is one of a video encoder or a video decoder.

Clause 19: A computer-readable storage medium having stored thereon instructions that, when executed, cause one or more processors to perform the method of any of clauses 1-15.

Clause 20: A device for filtering video data, the device comprising means for performing the method of any of clauses 1-15.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a coding tree unit (CTU) of video data, the CTU including a luminance (luma) block and a chrominance (chroma) block, to produce a decoded luma block and a decoded chroma block;
    determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and
    in response to determining that the chroma sample is on the first side and the luma sample is on the second side, disabling cross-component adaptive loop filtering (CC-ALF) for the chroma sample.

2. The method of claim 1, wherein the CTU conforms to one of a 4:4:4 format or 4:2:2 format.

3. The method of claim 1, wherein disabling CC-ALF for the chroma sample further comprises:
    determining that at least one neighboring luma sample to the luma sample in the decoded luma block is on the first side of the ALF virtual boundary, the at least one neighboring sample being within a CC-ALF-defined pattern for filtering the chroma sample; and
    in response to determining that the at least one neighboring sample is on the first side of the ALF virtual boundary, disabling CC-ALF for the chroma sample.

4. The method of claim 1, further comprising performing sample adaptive offset (SAO) filtering on the decoded luma block prior to disabling CC-ALF for the chroma sample.

5. The method of claim 1, further comprising:
    storing a value for the co-located luma sample in a first line buffer;
    storing a value for the chroma sample in a second line buffer, the second line buffer being different than the first line buffer; and
    clearing the first line buffer before determining that the chroma sample is on the first side and the co-located luma sample is on the second side.

6. The method of claim 1, further comprising encoding the CTU prior to decoding the CTU.

7. The method of claim 1, wherein the CTU comprises a first CTU, the luma block comprises a first luma block, the chroma block comprises a first chroma block, the decoded luma block comprises a first decoded luma block, the decoded chroma block comprises a first chroma block, the luma sample comprises a first luma sample, the chroma sample comprises a first chroma sample, and the CC-ALF virtual boundary comprises a first CC-ALF virtual boundary, the method further comprising:
    decoding a second CTU, the second CTU including a second luma block and a second chroma block, to produce a second decoded luma block and a second decoded chroma block;
    determining that a second chroma sample of the second decoded chroma block is on a first side of a second CC-ALF virtual boundary and that a second co-located luma sample of the second decoded luma block is on a second side of the second CC-ALF virtual boundary, the second co-located luma sample being co-located with the second chroma sample;

in response to determining that the second chroma sample is on the first side of the second CC-ALF virtual boundary and the second co-located luma sample is on the second side of the second CC-ALF virtual boundary, performing CC-ALF filtering of the second chroma sample using a replaced luma sample instead of the second co-located luma sample.

8. The method of claim 7, further comprising determining a value for the replaced luma sample using one or more luma samples that are closest to the co-located luma sample and that are on the first side of the ALF virtual boundary.

9. The method of claim 7, further comprising determining a value for the replaced luma sample using one or more mirrored luma samples.

10. The method of claim 7, further comprising determining a value for the replaced luma sample using one or more predefined values.

11. A device for decoding video data, the device comprising:

a memory configured to store video data; and one or more processors implemented in circuitry and configured to:

decode a coding tree unit (CTU) of the video data, the CTU including a luminance (luma) block and a chrominance (chroma) block, to produce a decoded luma block and a decoded chroma block;

determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disable cross-component adaptive loop filtering (CC-ALF) for the chroma sample.

12. The device of claim 11, wherein the CTU conforms to one of a 4:4:4 format or 4:2:2 format.

13. The device of claim 11, wherein to disable CC-ALF for the chroma sample, the one or more processors are configured to:

determine that at least one neighboring luma sample to the luma sample in the decoded luma block is on the first side of the ALF virtual boundary, the at least one neighboring sample being within a CC-ALF-defined pattern for filtering the chroma sample; and in response to determining that the at least one neighboring sample is on the first side of the ALF virtual boundary, disable CC-ALF for the chroma sample.

14. The device of claim 11, wherein the one or more processors are further configured to perform sample adaptive offset (SAO) filtering on the decoded luma block prior to disabling CC-ALF for the chroma sample.

15. The device of claim 11, wherein the one or more processors are further configured to:

store a value for the co-located luma sample in a first line buffer;

store a value for the chroma sample in a second line buffer, the second line buffer being different than the first line buffer; and clear the first line buffer before determining that the chroma sample is on the first side and the co-located luma sample is on the second side.

16. The device of claim 11, wherein the one or more processors are further configured to encode the CTU prior to decoding the CTU.

17. The device of claim 11, further comprising a display configured to display the decoded video data.

18. The device of claim 11, wherein the device comprises one or more of a camera, a computer, a mobile device, a broadcast receiver device, or a set-top box.

19. A non-transitory computer-readable storage medium having stored thereon instructions that, when executed, cause a processor to:

decode a coding tree unit (CTU) of video data, the CTU including a luminance (luma) block and a chrominance (chroma) block, to produce a decoded luma block and a decoded chroma block;

determine that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and in response to determining that the chroma sample is on the first side and the luma sample is on the second side, disable cross-component adaptive loop filtering (CC-ALF) for the chroma sample.

20. The non-transitory computer-readable storage medium of claim 19, wherein the CTU conforms to one of a 4:4:4 format or 4:2:2 format.

21. The non-transitory computer-readable storage medium of claim 19, wherein the instructions that cause the processor to disable CC-ALF for the chroma sample further comprise instructions that cause the processor to:

determine that at least one neighboring luma sample to the luma sample in the decoded luma block is on the first side of the ALF virtual boundary, the at least one neighboring sample being within a CC-ALF-defined pattern for filtering the chroma sample; and in response to determining that the at least one neighboring sample is on the first side of the ALF virtual boundary, disable CC-ALF for the chroma sample.

22. The non-transitory computer-readable storage medium of claim 19, further comprising instructions that cause the processor to perform sample adaptive offset (SAO) filtering on the decoded luma block prior to disabling CC-ALF for the chroma sample.

23. The non-transitory computer-readable storage medium of claim 19, further comprising instructions that cause the processor to:

store a value for the co-located luma sample in a first line buffer;

store a value for the chroma sample in a second line buffer, the second line buffer being different than the first line buffer; and clear the first line buffer before determining that the chroma sample is on the first side and the co-located luma sample is on the second side.

24. The non-transitory computer-readable storage medium of claim 19, further comprising instructions that cause the processor to encode the CTU prior to decoding the CTU.

25. A device for decoding video data, the device comprising:

means for decoding a coding tree unit (CTU) of video data, the CTU including a luminance (luma) block and a chrominance (chroma) block, to produce a decoded luma block and a decoded chroma block;

means for determining that a chroma sample of the decoded chroma block is on a first side of an adaptive loop filter (ALF) virtual boundary and that a co-located luma sample of the decoded luma block is on a second side of the ALF virtual boundary, the co-located luma sample being co-located with the chroma sample, the first side being different than the second side; and means for disabling cross-component adaptive loop filtering (CC-ALF) for the chroma sample in response to determining that the chroma sample is on the first side and the luma sample is on the second side.

26. The device of claim 25, wherein the CTU conforms to one of a 4:4:4 format or 4:2:2 format.

27. The device of claim 25, wherein the means for disabling CC-ALF for the chroma sample further comprises:
means for determining that at least one neighboring luma sample to the luma sample in the decoded luma block is on the first side of the ALF virtual boundary, the at least one neighboring sample being within a CC-ALF-defined pattern for filtering the chroma sample; and
means for disabling CC-ALF for the chroma sample in response to determining that the at least one neighboring sample is on the first side of the ALF virtual boundary.

28. The device of claim 25, further comprising means for performing sample adaptive offset (SAO) filtering on the decoded luma block prior to disabling CC-ALF for the chroma sample.

29. The device of claim 25, further comprising:
means for storing a value for the co-located luma sample in a first line buffer;
means for storing a value for the chroma sample in a second line buffer, the second line buffer being different than the first line buffer; and
means for clearing the first line buffer before determining that the chroma sample is on the first side and the co-located luma sample is on the second side.

30. The device of claim 25, further comprising means for encoding the CTU prior to decoding the CTU.

* * * * *